United States Patent
Howe et al.

(10) Patent No.: US 10,608,815 B2
(45) Date of Patent: Mar. 31, 2020

(54) CONTENT ENCRYPTION AND DECRYPTION USING A CUSTOM KEY

(71) Applicant: The Boeing Company, Chicago, IL (US)

(72) Inventors: Wayne R. Howe, Irvine, CA (US); Jeffrey H. Hunt, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 164 days.

(21) Appl. No.: 15/837,802

(22) Filed: Dec. 11, 2017

(65) Prior Publication Data
US 2020/0028673 A1    Jan. 23, 2020

Related U.S. Application Data

(63) Continuation-in-part of application No. 14/444,040, filed on Jul. 28, 2014, now Pat. No. 10,057,218.

(51) Int. Cl.
*H04L 29/06* (2006.01)
*H04L 9/08* (2006.01)
*H04L 9/30* (2006.01)
*G06F 16/901* (2019.01)

(52) U.S. Cl.
CPC ........ *H04L 9/0825* (2013.01); *G06F 16/9017* (2019.01); *H04L 9/085* (2013.01); *H04L 9/0838* (2013.01); *H04L 9/30* (2013.01)

(58) Field of Classification Search
CPC ..... H04L 63/0428; H04L 63/04; H04L 63/06; H04L 9/0825; H04L 9/0838; H04L 9/085; H04L 9/30; G06F 16/9017
See application file for complete search history.

(56) References Cited

U.S. PATENT DOCUMENTS

| | | | |
|---|---|---|---|
| 5,363,448 A * | 11/1994 | Koopman, Jr. | G06F 7/584 340/5.26 |
| 6,292,795 B1 * | 9/2001 | Peters | G06F 16/137 |
| 6,490,353 B1 | 12/2002 | Tan | |
| 8,855,303 B1 * | 10/2014 | Glatfelter | H04K 1/00 380/277 |
| 9,077,695 B2 | 7/2015 | Larson et al. | |
| 9,450,923 B2 * | 9/2016 | Klum | H04L 63/0428 |
| 9,621,526 B2 | 4/2017 | Abrahamson | |

(Continued)

FOREIGN PATENT DOCUMENTS

GB    2531113    4/2016

OTHER PUBLICATIONS

Intellectual Property Office, "Combined Search and Examination Report Under Sections 17 and 18(3)," App. No. GB1819755.8 (dated May 13, 2019).

*Primary Examiner* — Sarah Su
(74) *Attorney, Agent, or Firm* — Walters & Wasylyna LLC

(57) ABSTRACT

A method for securely communicating digital content includes steps of: (1) receiving data from a plurality of key sources; (2) retrieving a plurality of data sets from the data, each one of the plurality of data sets comprising a plurality of data units; (3) extracting a plurality of selected data units from the plurality of data units; (4) generating a custom key using the plurality of selected data units; (5) encrypting content using the custom key; and (6) transmitting encrypted content.

20 Claims, 14 Drawing Sheets

(56) References Cited

U.S. PATENT DOCUMENTS

| | | | |
|---|---|---|---|
| 2002/0023010 A1* | 2/2002 | Rittmaster | G06F 16/9537 705/26.1 |
| 2006/0075228 A1* | 4/2006 | Black | H04L 63/0428 713/167 |
| 2006/0177065 A1* | 8/2006 | Halbert | H04L 9/0662 380/277 |
| 2007/0189529 A1* | 8/2007 | Hauge | H04N 7/1675 380/200 |
| 2008/0066182 A1 | 3/2008 | Hickmott et al. | |
| 2010/0150344 A1 | 6/2010 | Karroumi et al. | |
| 2010/0246817 A1 | 9/2010 | Sadler | |
| 2011/0258440 A1* | 10/2011 | McDonald | H04L 9/0861 713/168 |
| 2013/0058483 A1* | 3/2013 | Whyte | H04L 9/3093 380/255 |
| 2013/0145177 A1* | 6/2013 | Cordella | G06F 12/1408 713/193 |
| 2013/0305037 A1* | 11/2013 | Puttaswamy Naga | H04L 63/0428 713/152 |
| 2014/0044262 A1 | 2/2014 | Loprieno et al. | |
| 2014/0136832 A1* | 5/2014 | Klum | H04L 63/0428 713/150 |
| 2014/0310824 A1* | 10/2014 | Ma | G06F 21/6209 726/30 |
| 2014/0372754 A1* | 12/2014 | Aissi | H04L 63/08 713/168 |
| 2015/0220912 A1* | 8/2015 | Holdsworth | G06Q 20/353 705/72 |
| 2015/0244520 A1* | 8/2015 | Kariman | H04L 9/0863 713/168 |
| 2015/0295707 A1 | 10/2015 | Howe et al. | |
| 2015/0295708 A1 | 10/2015 | Howe et al. | |
| 2015/0295907 A1 | 10/2015 | Abrahamson | |
| 2016/0315762 A1* | 10/2016 | Moon | H04L 9/065 |
| 2018/0013558 A1* | 1/2018 | Hassan | H04L 63/061 |

\* cited by examiner

| XOR DECRYPTION SCHEME | | |
|---|---|---|
| INPUT 49 | 68 | OUTPUT |
| ENCRYPTED DATA | DECRYPTION KEY | NON-ENCRYPTED DATA |
| b3,1 | b2,1 | b1,1 |
| b3,2 | b2,2 | b1,2 |
| b3,3 | b2,3 | b1,3 |
| b3,4 | b2,4 | b1,4 |
| b3,5 | b2,5 | b1,5 |
| ⋮ | ⋮ | ⋮ |
| b3,n | b2,n | b1,n |

FIG. 7

| KEY SOURCE DIRECTORY 532 | | | | |
|---|---|---|---|---|
| KEY SOURCE 508 | KEY SOURCE ID 562 | POINTERS 534 | | |
| | | WEBSITE POINTER 536 | TIME POINTER 538 | DATA POINTER 540 |
| KEY SOURCE 1 508a | KEY SOURCE ID 1 562a | WWW.EXAMPLE1.COM 536a | 03:15:42 AM 538a | b3-b19 540a |
| KEY SOURCE 2 508b | KEY SOURCE ID 2 562b | WWW.EXAMPLE2.COM 536b | 03:15:42 AM; 01:28:35 PM 538b | B5 540b |
| KEY SOURCE 3 508c | KEY SOURCE ID 3 562c | WWW.EXAMPLE3.COM 536c | 01:08:59:28 538c | 24b 540c |
| KEY SOURCE 4 508d | KEY SOURCE ID 4 562d | WWW.EXAMPLE4.COM 536d | 00:12:06:45 - 01:08:59:28 538d | - |
| KEY SOURCE 5 508e | KEY SOURCE ID 5 562e | WWW.EXAMPLE5.COM 536e | | b3-b19 540e |
| ... | ... | ... | ... | ... |
| 508n | 562n | 536n | 538n | 540n |

FIG. 11

CONTENT ENCRYPTION AND DECRYPTION USING A CUSTOM KEY

PRIORITY

This application is a continuation-in-part of U.S. Ser. No. 14/444,040 filed on Jul. 28, 2014.

FIELD

The present disclosure is generally related to content encryption and decryption and, more particularly, to methods, systems and computer program products for encrypting and decrypting content using a custom key generated from a plurality of key sources located on a computer network.

BACKGROUND

Providing secure transfers of data over the Internet and other communications networks has become increasingly important. One method of securing data transfers includes encrypting and/or decrypting the transferred data using either symmetric (private-key/private-key) or asymmetric (public-key/private-key) encryption and decryption architectures.

Symmetric encryption and decryption uses a single, unique encryption/decryption key to encrypt and decrypt each secure data package. However, in addition to potential complexity, processing overhead, and time delays, symmetric encryption may require the sender to communicate the encryption key to the recipient by various means, such as by electronic or non-electronic methods, which can compromise the security of the transaction.

Asymmetric encryption requires the use of both a public key and a private key, wherein multiple secure data packages are encrypted using the same public key. Asymmetric encryption may compromise the security of transferred data because if an unintended user discovers the private key used to decrypt an encrypted data package, the user will also be able to decrypt all of the data packages encrypted using the public key.

Furthermore, both symmetric and asymmetric encryption/decryption methods are generally based on complex mathematical computation. The more complex the encryption algorithm, the more time and processing power is required to encrypt and decrypt the message by authorized parties. This is a necessary deficiency however, because the more complex the encryption algorithm, the exponentially more time and processing power are required to break the encryption key (e.g., a brute force attack) and decrypt the message by an unauthorized third party. Nevertheless, as the processing power of computers and quantum computers increases, the likelihood of successful encryption breaking increases.

Therefore, there remains a need to increase the relative difficulty of decryption without increasing and/or potentially decreasing the mathematical computational complexity, processing power, and processing time for encryption and decryption.

SUMMARY

In one embodiment, the disclosed computing device may include an encryptor configured to derive an encryption key from a network resource and encrypt data using the encryption key to generate encrypted data.

In one embodiment, the encryption key used to generate the encrypted data may include at least one of an exclusive or encryption scheme, information used to generate the encrypted data, and/or information used to complicate the encrypted data.

In one embodiment, the encryptor may include encryption/decryption software instructions stored on a computer readable storage medium (e.g., non-transitory computer readable storage medium) and executed by a processing unit.

In one embodiment, the encryptor may include a hardwired encryption/decryption module.

In another embodiment, the network resource may include a key size at least as large as the data being encrypted.

In another embodiment, the network resource may include at least one of a web resource, a web-based service, a cloud-based service, a point-of-sale service, an IP address, a server response, a time of day response, a date response, an application, an application service, a process, network-based content, a network-based element, a network-based location, a network-based address, a uniform resource locator, a web page, a web-based data, a network transmission, and/or a one-time pad.

In another embodiment, the disclosed computing device may include a decryptor configured to derive a decryption key from a network resource and decrypt encrypted data using the decryption key to generate non-encrypted data.

In another embodiment, the decryption key used to decrypt the encrypted data may include at least one of an exclusive or decryption scheme, information used to decrypt the encrypted data, and/or information used to uncomplicate the encrypted data.

In another embodiment, the decryptor may include encryption/decryption software instructions stored on a computer readable storage medium (e.g., non-transitory computer readable storage medium) and executed by a processing unit.

In another embodiment, the decryptor may include a hardwired encryption/decryption module.

In another embodiment, the network resource may include a key size at least as large as the data being decrypted.

In another embodiment, the disclosed method may include the steps of (1) generating (e.g., deriving) an encryption key from a network resource, and (2) encrypting data (e.g., non-encrypted data or encrypted data) with the encryption key to generate encrypted data.

In another embodiment, encrypting the data with the encryption key may include encoding the data using at least one of an exclusive or encryption scheme, information to generate the encrypted data, and/or information to complicate the encrypted data.

In another embodiment, the disclosed method may include complicating the non-encrypted data with at least one of mixing, swapping, transposing, transforming, inverting, flipping, adding, inserting, replacing, hashing, and/or deleting bits.

In another embodiment, the network resource may include at least one of a network-based element identified by a network address and a web-based element identified by a web address.

In another embodiment, the disclosed method may include the steps of (1) generating (e.g., deriving) a decryption key (e.g., regenerating the encryption key) from a network resource, and (2) decrypting encrypted data with the decryption key to generate non-encrypted data (e.g., decrypted data).

In another embodiment, decrypting the encrypted data with the decryption key may include decoding the encrypted data with the decryption key using at least one of an exclusive or decryption scheme, information to generate the non-encrypted data, and/or information to uncomplicate the encrypted data.

In another embodiment, the disclosed method may include uncomplicating the encrypted data with at least one of mixing, swapping, transposing, transforming, inverting, flipping, adding, inserting, replacing, hashing, and/or deleting bits.

In another embodiment, the disclosed computing device may include a processing unit and a computer readable storage medium (e.g., non-transitory computer readable storage medium) having a plurality of instructions stored thereon, the plurality of instructions, when executed by the processing unit, causes the processing unit to (1) generate (e.g., derive) an encryption key from a network resource, and (2) encrypt data (e.g., non-encrypted data or encrypted data) with the encryption key to generate encrypted data.

In another embodiment, the plurality of instructions, when executed by the processing unit, further causes the processing unit to encode the data (e.g., non-encrypted data or encrypted data) with the encryption key using at least one of an exclusive or encryption scheme, information to generate the encrypted data, and/or information to complicate the encrypted data.

In another embodiment, the network resource may include at least one of a uniform resource locator, a web page, a web-based data, a network transmission, and a one-time pad.

In another embodiment, the disclosed computing device may include a processing unit and a computer readable storage medium (e.g., non-transitory computer readable storage medium) having a plurality of instructions stored thereon, the plurality of instructions, when executed by the processing unit, causes the processing unit to (1) generate (e.g., derive) a decryption key (e.g., regenerate the encryption key) from a network resource, and (2) decrypt encrypted data with the decryption key to generate non-encrypted data (decrypted data).

In another embodiment, the plurality of instructions, when executed by the processing unit, causes the processing unit to decode the encrypted data with the encryption key using at least one of an exclusive or decryption scheme, information to generate the non-encrypted data, and information to uncomplicate the encrypted data.

In another embodiment, the disclosed system for transferring or storing information securely includes an encryptor configured to derive an encryption key from a first network resource and encrypt data (e.g., non-encrypted data or encrypted data) using the encryption key to generate encrypted data, a decryptor configured to derive a decryption key from a second network resource and decrypt the encrypted data using the decryption key to generate non-encrypted data (e.g., decrypted data), and a network coupled to the encryptor, the decryptor, the first network resource and the second network resource.

In another embodiment, the encryptor uses the network to communicate with the first network resource to generate the encryption key, and the encryptor uses the encryption key to encode the non-encrypted data using at least one of an exclusive or encryption scheme, information to generate the encrypted data, and/or information to complicate the encrypted data to produce the encrypted data.

In another embodiment, the encryptor complicates the data with at least one of mixing, swapping, shifting, transposing, transforming, inverting, flipping, adding, inserting, replacing, hashing, and deleting bits.

In another embodiment, the encryptor transfers the encrypted data to the decryptor.

In another embodiment, the decryptor uses the network to communicate with the second network resource to generate the decryption key, and the decryptor uses the decryption key to decode the encrypted data using at least one of an exclusive or decryption scheme, information to generate the non-encrypted data, and/or information to uncomplicate the encrypted data to produce the non-encrypted data.

In another embodiment, the decryptor uncomplicates the encrypted data with at least one of mixing, swapping, shifting, transposing, transforming, inverting, flipping, adding, inserting, replacing, hashing, and/or deleting bits.

In another embodiment, the first network resource and the second network resource are the same.

In another embodiment, the first network resource and the second network resource are different.

In another embodiment, at least one of the first network resource and the second network resource may include at least one of a network-based element identified by a network address and a web-based element identified by a web address.

In another embodiment, at least one of the first network resource and the second network resource includes at least one of a uniform resource locator, a web page, a web-based data, a network transmission, and/or a one-time pad.

In another embodiment, the data may include at least one of a data file and a data stream.

In another embodiment, the disclosed method for generating a custom key for encrypting and decrypting content includes steps of: (1) receiving data from a plurality of key sources; (2) retrieving a plurality of data sets from the data, each one of the plurality of data sets comprising a plurality of data units; (3) extracting a plurality of selected data units from the plurality of data units; and (4) generating a custom key for encrypting and decrypting content using the plurality of selected data units.

In another embodiment, the disclosed method for securely communicating content includes steps of: (1) receiving data from a plurality of key sources; (2) retrieving a plurality of data sets from the data, each one of the plurality of data sets comprising a plurality of data units; (3) extracting a plurality of selected data units from the plurality of data units; (4) generating a custom key using the plurality of selected data units; (5) encrypting content using the custom key; and (6) transmitting encrypted content.

In yet another embodiment, the disclosed computer program product includes a non-transitory computer-readable medium including computer-readable instructions stored thereon, wherein execution of the computer-readable instructions by a processor unit causes the processor unit to: (1) receive data from a plurality of key sources; (2) retrieve a plurality of data sets from the data, each one of the plurality of data sets comprising a plurality of data units; (3) extract a plurality of selected data units from the plurality of data units; and (4) generate a custom key for encrypting and decrypting content using the plurality of selected data units.

Other embodiments of the disclosed device, system and method will become apparent from the following detailed description, the accompanying drawings and the appended claims.

BRIEF DESCRIPTION OF THE DRAWINGS

FIG. 7 is a schematic illustration of the exclusive or decryption scheme, which may be used to decrypt data;

FIG. 11 is a schematic illustration of one embodiment of a key source directory used in the key generation process;

DETAILED DESCRIPTION

Figure 1:
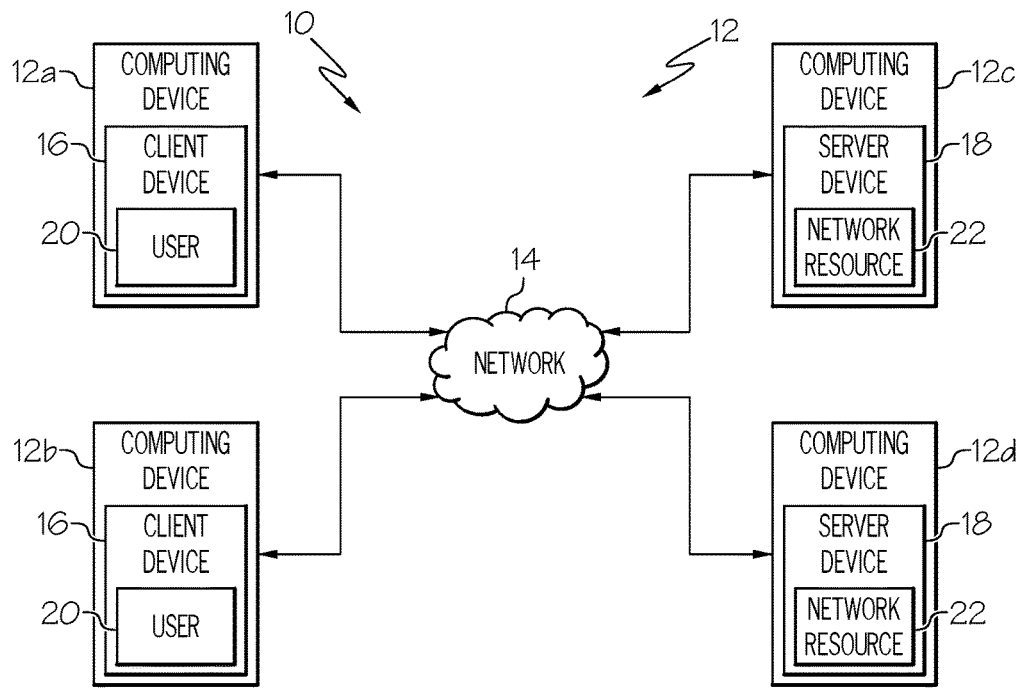
FIG. 1 is a schematic block diagram of one embodiment of the disclosed system for encrypting data.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIG. 1, one embodiment of the disclosed system, generally designated 10, for encrypting data, decrypting data, and/or communicating encrypted data (e.g., transmitting or storing information securely) may include a plurality of computing devices 12 (identified individually as computing device 12a, 12b, 12c, 12d). The plurality of computing devices 12 may communicate (e.g., transmit and/or receive) data and/or information to one another. In one embodiment, the plurality of computing devices 12 may be connected together via a network 14. In another embodiment, the plurality of computing devices 12 may be directly connected together. In yet another embodiment of the disclosed system 10, the computing devices 12 may be processors and/or processes using inter-processor and/or inter-process communication, which may be between processors and/or processes directly connected together or across the network 14.

A computing device 12 may include any system, device, and/or combination of systems and/or devices that is able to establish a connection (e.g., a wired, a wireless, an optical, or a cellular connection) to communicate with another system, device and/or combination of systems and/or devices. For example, the computing device 12 may include, but is not limited to, a server, a desktop server, a web server, a cloud-based server, a desktop computer, an airplane computer, a satellite computer, a client computer, a host computer, a point-of-sale device, a computer cluster, a notebook computer, a laptop computer, a handheld computer, a mobile phone (e.g., a smart phone), a personal digital assistant (PDA), a tablet PC, or the like.

In one embodiment, the network 14 may be any collection of distinct networks operating wholly or partially in conjunction to provide connectivity to the computing devices 12 and allow communication of data between computer devices 12. For example, the network 14 over which the plurality of computing devices 12 communicate, may include, but is not limited to, the Internet, a telephonic network, a cellular network, a fiber network, a wireless network, a cloud-based network, a military or defense network, a point-of-sale network, a private network (e.g., intranet), a local area network (LAN), a wide area network (WAN), a personal area network (PAN), or a combination thereof. As one example, the network 14 may be a cloud-based environment or a web-based environment. In an example, communications may be achieved by a secure communications protocol, such as secure sockets layer (SSL) or transport layer security (TLS).

In one embodiment, one or more of the computing devices 12 may be a client device 16 and one or more of the computing devices 12 may be a server device 18 (e.g., a host server). For example, and as illustrated in FIG. 1, computing devices 12a and 12b may be client devices 16 and computing devices 12c and 12d may be server devices 18. As one example, the client device 16 may have an associated user 20. As one example, the server device 18 may host a network resource 22. For example, the network resource 22 may include, but is not limited to, web-based services, cloud-based services, point-of-sale services, Internet Protocol (IP) addresses, server responses, time of day and/or date responses, applications, application services, processors, processes and/or process servers.

Client devices 16 may communicate with one another over the network 14. Client devices 16 may communicate with server devices 18 over the network 14. Server devices 18 may communicate with one another over the network 14. Thus, communications may be client-to-client, client-to-server, server-to-client, and/or server-to-server. Those skilled in the art will recognize that any number of computing devices 12 (e.g., client devices 16 and/or server devices 18) may be included in the system 10 and in communication over the network 14.

Figure 2:
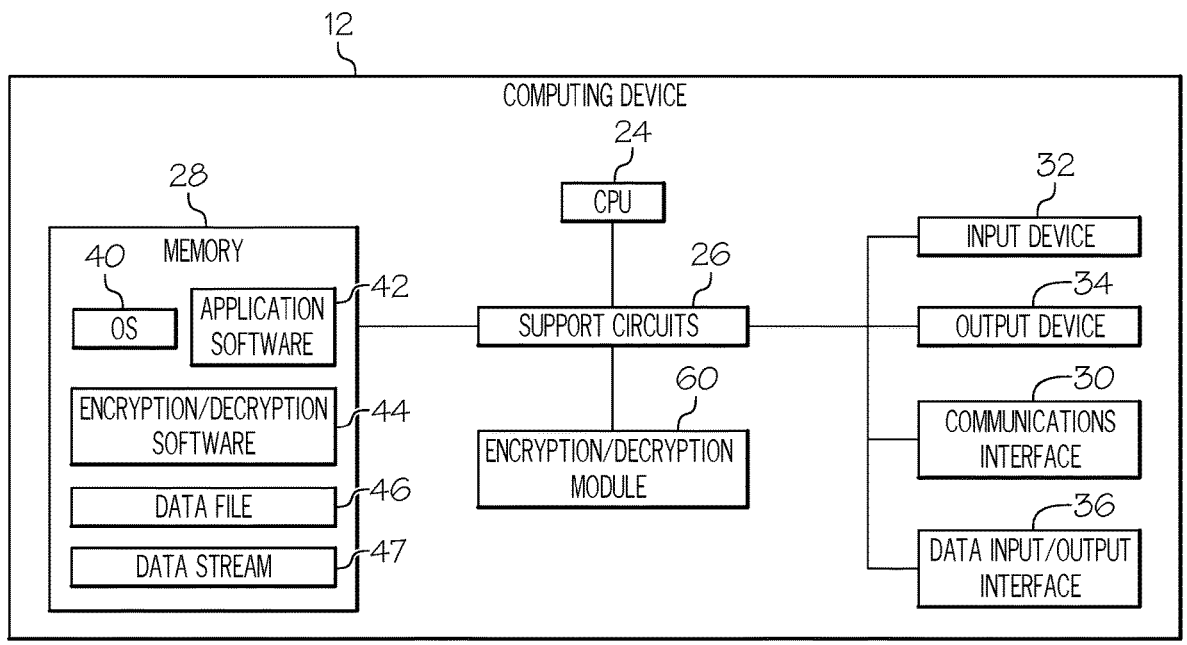
FIG. 2 is a schematic block diagram of one embodiment of the disclosed computing device of FIG. 1.

Referring to FIG. 2, in one embodiment, the computing device 12 may include a central processing unit (CPU) 24 (also referred to herein as processing unit), support circuits 26, a memory 28, and a communication interface 30. The computing device 12 may also include at least one of an input device 32, an output device 34, and/or a data input/output interface 36.

Those skilled in the art will recognize that the computing device 12 may include more components, fewer components, and/or a different configuration of components than illustrated in FIG. 2.

The CPU 24 may include one or more processors or microprocessors that interpret and execute instructions. The processing unit may be of any type including, but not limited to, a central processing unit, a microprocessor, a microcontroller, a digital signal processor, or any combination thereof. The CPU 24 may be configured to execute computer instructions that, when executed, cause the CPU 24 to perform one or more of the operations described herein with respect to the computing device 12 (e.g., the client device 16 and/or the server device 18), application software 42 and/or encryption/decryption software 44. The support circuits 26 may include power supplies, clocks, input/output interface circuitry, communication interface circuitry, communication bus circuitry, and the like. The memory 28 may include volatile memory or persistent or non-volatile computer storage medium. The memory 28 may include, but is not limited to, random access memory (RAM), read only memory (ROM), removable disk memory, programmable read-only memory (PROM), erasable programmable read-only memory (EPROM), electrically erasable programmable read-only memory (EEPROM), flash memory or other solid state storage device, compact disc-ROM (CD-ROM) or other optical disk storage, magnetic disk storage or other magnetic storage device, another type of memory, or a combination of these types of memory. The memory 28 may be main memory and may, in part, be used as cache memory or buffer memory. The memory 28 may store computer instructions that may be executed by the CPU 24 to perform one or more of the operations described herein with respect to the computing device 12 (e.g., the client device 16 and/or the server device 18), the application software 42 and/or the encryption/decryption software 44.

The communication interface 30 may include any device that permits communication of data between computer devices 12, such as over the network 14. As one example, the communication interface 30 may include a network interface controller (NIC) that connects the computing device 12 to the network 14 (e.g., via an Ethernet connection, a cellular connection, or a Wi-Fi connection). As another example, the communication interface 30 may include any network or application protocols or services including, but not limited to, Transmission Control Protocol/Internet Protocol (TCP/IP); client-server protocols; Time and Date Services; Address Resolution Protocols (ARP); User Datagram Protocol (UDP); Multicasting protocols; Domain Name Service (DNS) protocols; Remote login protocols (e.g., TELNET and Rlogin); Application and File Transfer Protocols (e.g., File Transfer Protocol (FTP), Trivial File Transfer Protocol (TFTP), and Network File System (NFS)); Email applications (e.g., Simple Mail Transfer Protocol (SMTP) and Multipurpose Internet Mail Extensions (MIME)); and Internet Management protocols (e.g., Simple Network Management Protocol (SNMP) and SNMP2).

The input device 32 may include any device that permits a user 20 to input information to the computing device 12 including, but not limited to, a keyboard, a keypad, a mouse, a pen, a microphone, a touchscreen display, and the like. The output device 34 may include any device that outputs information to the user 20 including, but not limited to, a display, a speaker, a gaming port, and the like. The data input/output interface 36 may include any device that permits data to be transmitted to and/or received by the computing device 12 such as a data port that is connected to an external device (e.g., an external hard drive, an optical disk drive, a flash memory drive, digital-to-analog, or analog to digital converter, etc.).

The memory 28 may store various software packages, such as an operating system (OS) 40, application software 42, and/or encryption/decryption software 44. The operating system 40 may be any software that manages the hardware resources of the computing device 12 and provides common services for other programs (e.g., application software 42 and/or encryption/decryption software 44). The application software 42 may include, but is not limited to, web browsing software, database software, word processing software, electronic mail software, point-of-sale software, application services (e.g., time of day or date services), and the like. The application software 42 may store data in one or more associated data files 46 (e.g., data at rest) or may generate data as one or more data streams 47 (e.g., data in motion).

In one embodiment, software instructions (e.g., the encryption/decryption software 44) may be executed by the CPU 24 to implement the steps and/or operations described herein below. The encryption/decryption software 44 may take the form of a computer program product embodied in one or more computer readable mediums having computer readable program code embodied thereon. As used herein, the term computer-readable medium refers to any medium that participates in providing instructions to the CPU 24 for execution. Any combination of one or more computer readable mediums may be utilized. As one example, the computer readable medium may include a computer readable storage medium, such as a non-transitory computer readable storage medium (e.g., the memory 28).

The computing device 12 may perform certain operations in response to the CPU 24 executing software instructions contained in the computer-readable medium, such as the memory 28. The software instructions may be read into the memory 28 from another computer-readable medium or from another system and/or device, for example, via the communication interface 30, the input device 32, and/or the data input/output interface 36. The software instructions contained in the memory 28 may cause the CPU 24 to perform some or all of the operations described herein below.

Alternatively, or additionally, hardwired circuitry may be used in place of or in combination with the software instructions (e.g., the encryption/decryption software 44) to implement the steps and/or operations described herein below. As one example, the computing device 12 may include an encryption/decryption module 60. For example, the encryption/decryption module 60 may include, but is not limited to, an application-specific integrated circuit (ASIC), a field-programmable gate array (FPGA), or the like.

Thus, implementations of the disclosed method 100 (FIG. 3) described herein below are not limited to any specific combination of hardware circuitry and/or software instructions. As used herein, an encryptor 62 (FIG. 5) may include the encryption/decryption software 44, the encryption/decryption module 60, or any combination of the encryption/decryption software 44 and/or the encryption/decryption module 60. As used herein, a decryptor 64 (FIG. 5) may include the encryption/decryption software 44, the encryption/decryption module 60, or any combination of the encryption/decryption software 44 and/or the encryption/decryption module 60.

Figure 3:
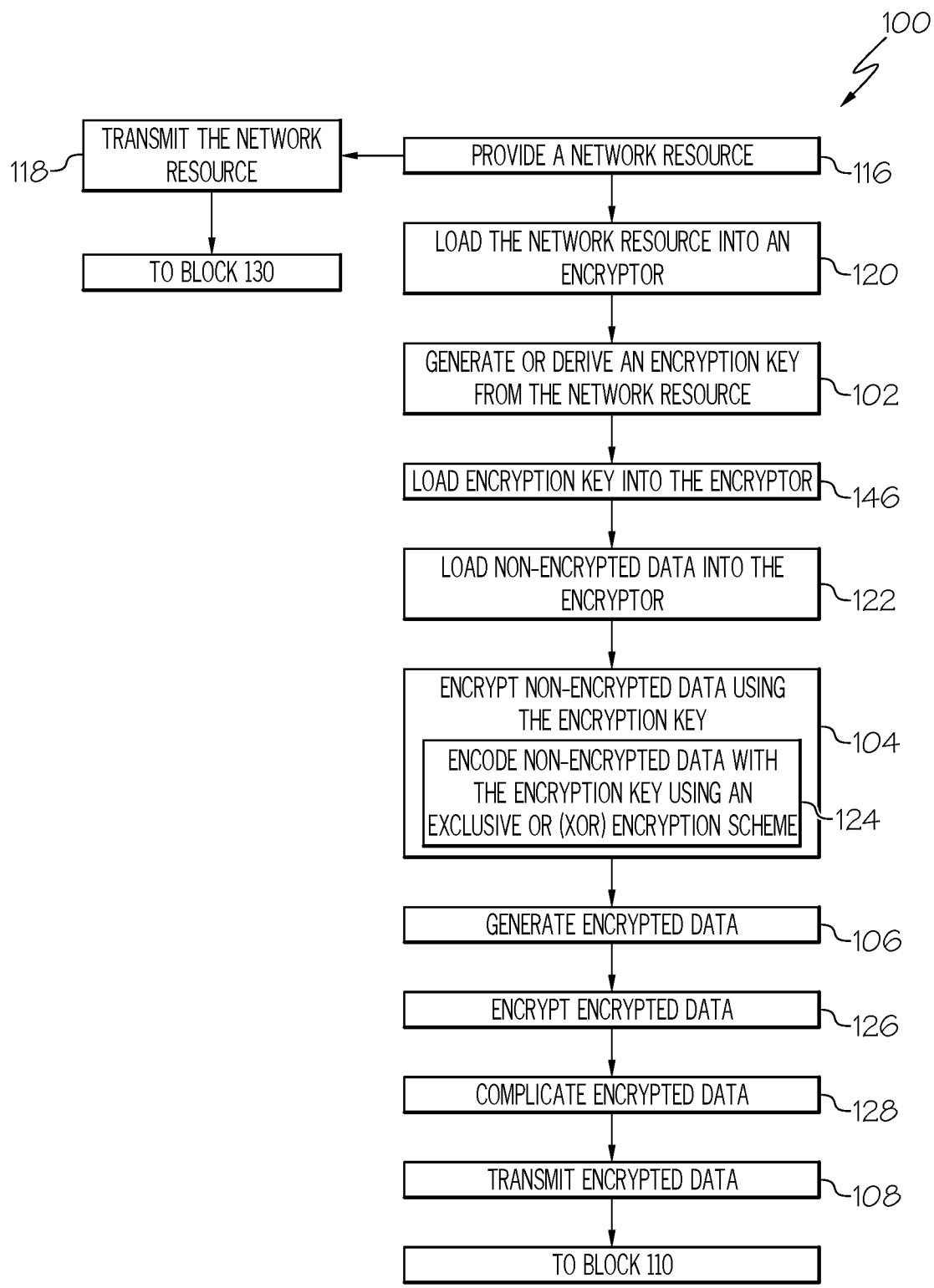
FIG. 3 is a flow diagram of one embodiment of the disclosed method for encrypting data.
Figure 4:
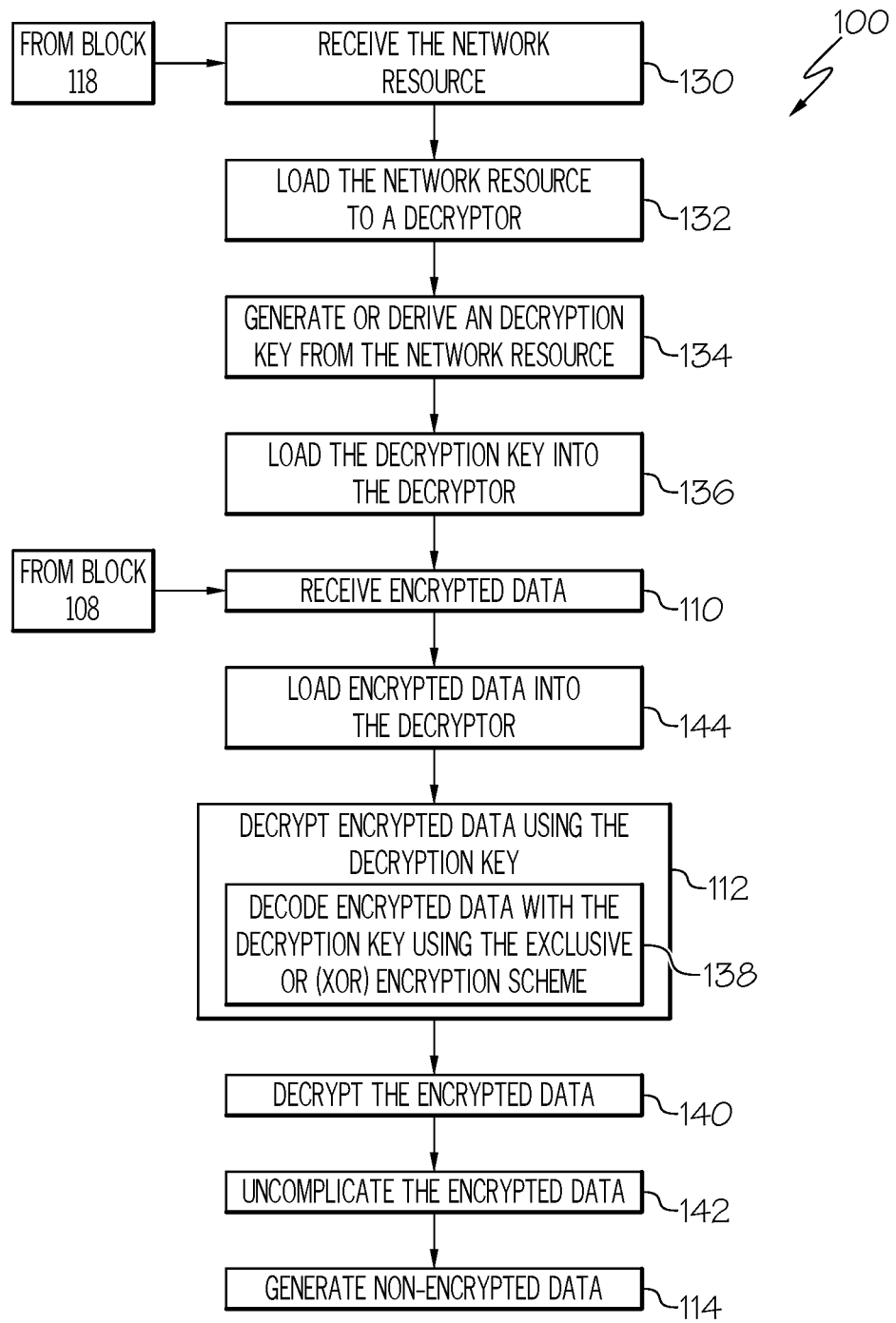
FIG. 4 is a flow diagram of one embodiment of the disclosed method for decrypting data.

Referring to FIGS. 3 and 4, the disclosed method, generally designated 100, for encrypting data, decrypting data, and/or communicating encrypted data may include a series of operational steps (e.g., instructions) implemented by the computing device 12 and executed by one or more computer program products (e.g., encryption/decryption software 44) and/or hardware (e.g., encryption/decryption module 60).

Figure 5:
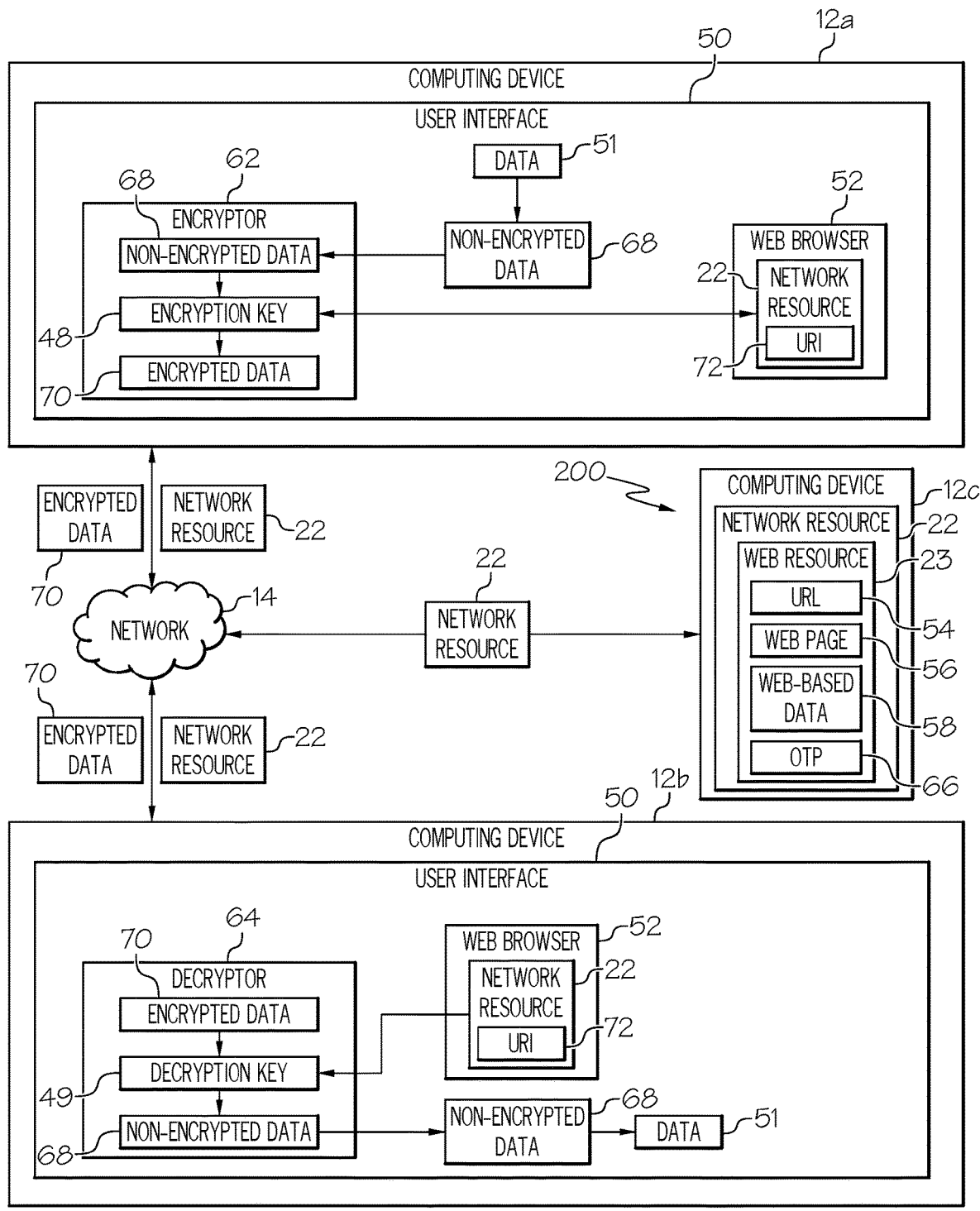
FIG. 5 is a schematic block diagram of one embodiment of the operating environment implementing the disclosed methods represented in FIGS. 3 and 4.

Referring to FIGS. 3 and 4, and with reference to FIG. 5, in one embodiment, the disclosed method 100 may include generating (e.g. deriving) an encryption key 48 from the network resource 22, as shown at block 102; encrypting (e.g., by a first computing device 12a) data 51 (e.g., a data file 46 and/or a data stream 47), such as non-encrypted data 68 or encrypted data 70 using the encryption key 48, as shown at block 104; generating encrypted data 70, as shown at block 106; transmitting (e.g., by the first computing device 12a) the encrypted data 70, as shown at block 108; receiving the (e.g., by a second computing device 12b) the encrypted data 70, as shown at block 110; decrypting (e.g., by the second computing device 12b) the encrypted data 70 using a decryption key 49, as shown at block 112; and generating the non-encrypted data 68 (e.g., decrypted data), as shown at block 114.

As used herein, generating encrypted data 70 and/or generating non-encrypted data 68 (e.g., decrypted data) may include any process or operation that produces, yields, achieves, or otherwise creates encrypted data 70 and/or non-encrypted data 68, respectively.

In one example implementation, the encryption key 48 and the decryption key 49 may be the same. In another example implementation, the encryption key 48 and the decryption key 49 may be different.

Referring to FIG. 5, one embodiment of an example operating environment, generally designated 200, in which the disclosed system 10 and method 100 may be implemented may include the first (e.g., transmitting) computing device 12a, the second (e.g., receiving) computing device 12b, and a third (e.g., web-hosting or network hosting) computing device 12c in communication with one another, for example, over the network 14.

As one example, the first computing device 12a and the second computing device 12b may be client devices 16 and the third computing device 12c may be a server device 18, as described herein above. The first computing device 12a and the second computing device 12b may include a user interface 50. The user interface 50 may be any graphical user interface that allows the user 20 to interact with the computing device 12a, 12b, application software 42 (FIG. 2), and/or the encryptor 62 and decryptor 64, for example, via a display on the output device 34 (FIG. 2). As one example, the application software 42 may include a web browser 52 for entering information and/or retrieving, presenting, and/or traversing network resources 22, for example, information resources, web resources, or cloud-based services such as on the World Wide Web. As another example, the user interface 50 may interact with the application software 42 and/or the communications interface 30 to access the network resources 22 using network or application protocols or services including, but not limited to, for example, TCP/IP; client-server protocols; Time and Date Services; ARP; UDP; Multicasting protocols; DNS protocols; Remote login protocols (e.g., TELNET and Rlogin); Application and File Transfer Protocols (e.g., FTP, TFTP, NFS); Email applications (e.g., SMTP and MIME); and Internet Management protocols (e.g., SNMP and SNMP2).

Referring to FIG. 3, and with reference to FIG. 5, the network resource 22 may be provided to the first computing device 12a, as shown at block 116. In an example embodiment, the network resource 22 may be a web resource 23, a cloud-based resource, network services, application services, or any other network-oriented services or information. As one example, the web resource 23 may be selected from any web-based information available on the World Wide Web. In one example implementation, the computing device 12 (e.g., via the encryptor 62) may automatically and/or randomly select the network resource 22 and provide the network resource 22 to the encryptor 62. In another example implementation, the user 20 of the computing device 12 may select the network resource 22 and provide the network resource 22 to the encryptor 62.

Referring to FIG. 5, the network resource 22 may include any network-based or web-based content, element, location, and/or address, for example, identified by a uniform resource identifier (URI) 72 (e.g., a web address) and/or any network-based content, element, location, and/or address, for example, identified by network-based identifier (e.g., network address). In one example implementation, the network resource 22 (e.g., network-based resource or web-based resource) may include mapping and/or addressing to another network resource 22 and/or web resource 23 (e.g., network-based resource or web-based resource). For example, accessing the network resources 22 may use any network or application protocols for transfer of data, non-encrypted data, encrypted data, encryption keys, decryption keys, and any other relevant information. In another example implementation, the network resource 22 (e.g., network-based resource or web-based resource) may be stored on the third computing device 12c. For example, the network resource 22 may be hosted by the server device 18 (e.g., a network server or web server).

As one example, the network resource 22 (e.g., the web resource 23) may include a uniform resource locator (URL) 54. The URL 54 may include a string of characters representing a web page address (e.g., www.abc123.com) of the web resource 23 or a network address of the network resource 22. The URL 54 may be used to define, derive, and/or generate the encryption key 48 and/or the decryption key 49, and/or any information used to generate encrypted data 70, decrypt encrypted data 70, complicate data 51 (e.g., encrypted data 70 or non-encrypted data 68), or uncomplicate data 51 (e.g., encrypted data 70 or non-encrypted data 68).

As used herein, to complicate data 51 (e.g., encrypted data 70 or non-encrypted data 68) may include any process or operation that makes the data more complex, intricate, involved, or difficult. As used herein, to uncomplicate data 51 (e.g., encrypted data 70 or non-encrypted data 68) may include any process or operation that makes the data less complex, less intricate, less involved, or less difficult.

In one example implementation the network resource 22 (e.g., web-resource 23) providing to the encryptor 62 the encryption key 48, and/or any information used to generate encrypted data 70, and/or any information used to complicate data 51 (e.g., encrypted data 70 or non-encrypted data 68), may be the same network resource 22 that provides to the decryptor 64 the decryption key 49, and/or any information used to decrypt encrypted data 70, and/or any information used to uncomplicate data 51 (e.g., encrypted data 70 or non-encrypted data 68). In another example implementation the network resource 22 providing to the encryptor 62 the encryption key 48, and/or any information used to generate encrypted data 70, and/or any information used to complicate data 51 (e.g., encrypted data 70 or non-encrypted data 68), may be a different network resource 22 than provides to the decryptor 64 the decryption key 49, and/or any information used to decrypt encrypted data 70, and/or any information used to uncomplicate data 51 (e.g., encrypted data 70 or non-encrypted data 68). In yet another example implementation, the encryption key 48 and/or decryption key 49 and/or any information used to generate encrypted data 70, decrypt encrypted data 70, complicate data 51, or uncomplicate data 51 may include (e.g., be composed of) information derived from multiple different network resources 22.

As another example, the network resource 22 (e.g., the web resource 23) may include a web page 56 itself and/or at least a portion of the contents of the web page 56. The web page 56 may be any web data (e.g., web content and/or web document) located at a particular URL 54 (e.g., having a URI 72) and that is suitable for the World Wide Web and display on the web browser 52. For example, the web page 56 may include, but is not limited to, textual information, non-textual information (e.g., images and/or graphics), and the like. The web page 56 may be a static web page or a dynamic web page. The web page 56 may be used to define, derive, and/or generate the encryption key 48 and/or the decryption key 49.

As another example, the network resource 22 may include network-based data (e.g., the web resource 23 may include web-based data 58). The web-based data 58 (e.g., network-based data) may be any native data contained within a web page 56, contained at a network address, and/or located at a particular URL 54 (e.g., having a URI 72). For example, the web-based data 58 may include, but is not limited to, a text file, an image file, an audio file (e.g., static or streaming), a video file (e.g., static or streaming), and the like. The web-based data 58 may be used to define, derive, and/or generate the encryption key 48. Network-based data may include similar types of data hosted on a network server or drive.

As another example, the network resource 22 may be a one-time pad (OTP) 66 stored, for example, on a web page 56, on a network server and/or drive, and/or located at a particular URL 54 (e.g., having a URI 72). For example, the OTP 66 may be a data file or data stream uploaded to the web page 56 for the intended purpose of being used to define, derive, and/or generate the encryption key 48 and/or decryption key 49 and/or any information used to generate encrypted data 70, decrypt encrypted data 70, complicate data 51 (e.g., encrypted data 70 or non-encrypted data 68), or uncomplicate data 51 (e.g., encrypted data 70 or non-encrypted data 68).

As yet another example, the network resource 22 may be or may include non-predictive information or values that are not known in advance of being used to define, derive, and/or generate the encryption key 48 and/or decryption key 49 and/or any information used to generate encrypted data 70, decrypt encrypted data 70, complicate data 51 (e.g., encrypted data 70 or non-encrypted data 68), or uncomplicate data 51 (e.g., encrypted data 70 or non-encrypted data 68). As one example, such non-predictive information or values may include stock market prices.

A new and/or different (e.g., refreshed) encryption key 48 and/or decryption key 49 and/or any information used to generate encrypted data 70, decrypt encrypted data 70, complicate data 51 (e.g., encrypted data 70 or non-encrypted data 68), or uncomplicate data 51 (e.g., encrypted data 70 or non-encrypted data 68) may be generated (e.g., derived), for example, from the selected network resource 22 (e.g., web resource 23) and used to encrypt and decrypt data 51 each time the disclosed method 100 is implemented. Additionally, since the encryption key 48 and/or decryption key 49 and/or any information used to generate encrypted data 70, decrypt encrypted data 70, complicate data 51, or uncomplicate data 51 may be generated from any available web resource 23, an extremely large number and continually growing number of possible encryption keys 48 and/or decryption keys 49 may be available (e.g., over one billion available possibilities as of this disclosure just for encryption key 48 and/or decryption key 49 sources).

Furthermore, when the encryption key 48 and/or decryption key 49 is generated from the web page 56, the web-based data 58, the OTP 66, and/or a combination thereof, the key size (e.g., the key length measured in bits) may be massive. For example, a massive encryption key 48 may include a key size substantially larger than traditional large asymmetric encryption keys (e.g., 128-bit key, 256-bit key, 512-bit key, 1024-bit key, etc.). As one example, the massive encryption key 48 and/or decryption key 49 may include key size greater than a 2,048-bit key, for example, currently considered a very large key size. As another example, the massive encryption key 48 and/or decryption key 49 may include at least a 10 GigaByte key, for example, derived from a random or non-random encoded hard drive or server. As yet another example, the massive encryption key 48 and/or decryption key 49 may include at least a 72 Terabit key, for example, derived from a two hour high definition video streaming at 10 Gigabits per second.

Alternatively, as one example, a small encryption key 48 and/or decryption key 49 of fifty characters or less may be derived to encode a short email or a text message.

Thus, continually refreshing the encryption key 48 and/or decryption key 49, the extremely large number of possible keys that can be derived from the extremely large number of network nodes and/or web sites, and/or the massive potential key sizes may significantly increase the difficulty of breaking (i.e., "hacking") the encryption key 48 and/or decryption key 49 and/or any information used to generate encrypted data 70, decrypt encrypted data 70, complicate data 51 (e.g., encrypted data 70 or non-encrypted data 68), or uncomplicate data 51 (e.g., encrypted data 70 or non-encrypted data 68).

Referring to FIG. 3, and with reference to FIG. 5, the network resource 22 may be loaded into the encryptor 62, as shown at block 120. In one example implementation, the network resource 22 (e.g., web resource 23) may be loaded and/or viewed on the web browser 52 of the first computing device 12a and the encryptor 62 may capture and/or load the network resource 22 from the web browser 52. As one example, the URI 72 of the network resource 22 (e.g., the URL 54, the web page 56, the web-based data 58, the OTP 66, the non-predictive information or values, and/or any information used to generate encrypted data 70, decrypt encrypted data 70, complicate data 51, or uncomplicate data 51) may be loaded into the web browser 52 of the first computing device 12a, access to the network resource 22 may be requested by the first computing device 12a from the third computing device 12c, and the network resource 22 may be received (e.g., downloaded) by the first computing device 12a (e.g., by the web browser 52).

In another example implementation, the network resource 22 (e.g., a network-based resource or a web-based resource) may be loaded directly (e.g., as input data) into the encryptor 62 from the web browser 52. As one example, the encryptor 62 may pull the network resource 22 from browsing data of the web browser 52 once the network resource 22 has been received. The encryptor 62 may have access to and be in communication with the web browser 52.

In yet another example implementation, the user 20 of the first computing device 12a may input (e.g., manually input and/or automatically input) the network resource 22 (e.g., the URI 72) into the encryptor 62.

Generating, defining, and/or deriving the encryption key 48 (also referred to herein as a first encryption key) from the network resource 22 (block 102) may be performed in whole or in part by the encryptor 62. In one example embodiment, the CPU 24 (FIG. 2) may execute instructions provided by the encryption/decryption software 44 to generate (e.g., derive) the encryption key 48 (e.g., the first encryption key) defined by the network resource 22. In another example embodiment, the encryption/decryption module 60 may generate the encryption key 48 (e.g., the first encryption key) defined by the network resource 22. The encryption key 48 generated by the encryptor 62 may specify a particular transformation of non-encrypted data 68 (e.g., plaintext) to encrypted data 70 (e.g., ciphertext) during an encryption operation.

As shown at block 146, the encryption key 48 may be loaded into the encryptor 62. As one example, the encryption key 48 generated (e.g., derived) from the network resource 22 (e.g., network-based resource or web-based resource) by the encryptor 62 (block 102) may be automatically loaded into the encryptor 62.

As shown at block 122, the non-encrypted data 68 may be loaded into encryptor 62. The non-encrypted data 68 may be selected from any data 51 (FIG. 5), such as a data file 46 or data stream 47 (FIG. 2). For example, the data 51 may include, but is not limited to, an electronic mail file (e.g., email), a text file (e.g., a document), an audio file, a video file, an image file, a real-time voice stream (e.g., a phone call), a real-time video camera stream, flight control information, military or defense communications, and the like.

Figure 6:
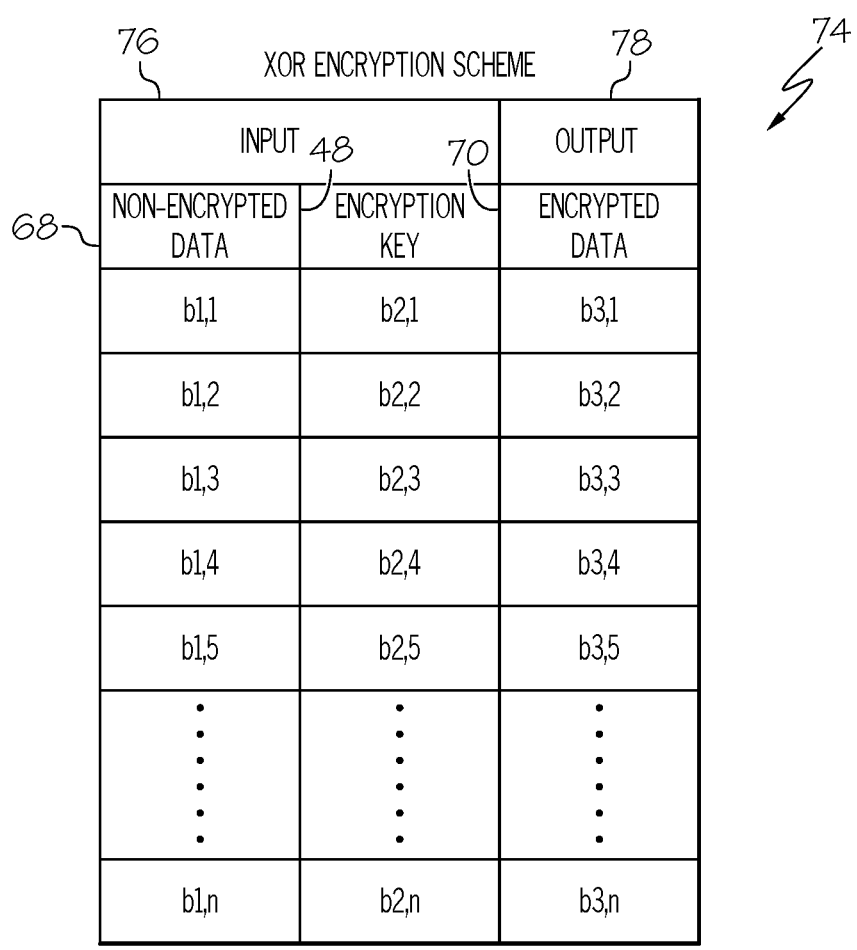
FIG. 6 is a schematic illustration of one embodiment of the exclusive or encryption scheme, which may be used to encrypt data.

Referring to FIG. 3, and with reference to FIGS. 5 and 6, in one example implementation, encrypting the data 51 (e.g., the non-encrypted data 68) using the encryption key 48 (block 104) may include encoding the non-encrypted data 68 with the encryption key 48 using an exclusive or (XOR) encryption scheme 74, as shown at block 124, to generate the encrypted data 70 (block 106).

The operation shown at block 104 describes encrypting non-encrypted data 68 to generate encrypted data 70. However, the operation shown at block 104 may include encrypting any data 51 (e.g., non-encrypted data 68 or encrypted data 70). For example, previously encrypted data may be further encrypted under the operation shown at block 104, as described herein.

Referring to FIG. 6, as one example, the XOR encryption scheme 74 used to encrypt the non-encrypted data 68 may include one or more bits of data (e.g., $b_{1,1}$-$b_{1,n}$) of the non-encrypted data 68 and one or more bits of data ($b_{2,1}$-$b_{2,n}$) of the encryption key 48 as input 76. The encryptor 62 may use an exclusive or function (e.g., logic operation) to generate one or more bits of data ($b_{3,1}$-$b_{3,n}$) of the encrypted data 70 as output 78. The bits of data of the non-encrypted data 68 may be encrypted with the encryption key 48 bit-by-bit, in batches of bits, or as a bit stream.

Thus, the XOR encryption scheme 74 may provide a symmetric and single cycle computational operation to encrypt the non-encrypted data 68 using the encryption key 48 generated from the network resource 22.

Referring to FIG. 3, in one embodiment, the method 100 may include performing one or more additional and/or alternative encrypting and/or data complication operations to provide further difficulty in breaking the encryption.

In one example implementation, the non-encrypted data 68 and/or the encrypted data 70 may be alternatively and/or additionally encrypted using standard encryption (e.g., using an alternative or additional encryption algorithm), as shown at block 126. As one example, the standard encryption may include, but is not limited to, symmetric encryption (e.g., Advanced Encryption Standard (AES) or Data Encryption Standard (DES)), asymmetric encryption (e.g., public-key/private-key encryption), or any other type of encryption such as authentication encryption, hashing, or the like. Information to alternatively and/or additionally encrypt using standard encryption (e.g., using an alternative or additional encryption algorithm), as shown at block 126, may be generated or derived from the network resources 22 in the same manner as described herein.

In one example implementation, the non-encrypted data 68 and/or the encrypted data 70 may be alternatively and/or additionally complicated using a mathematical function, as shown at block 128. As one example the mathematical function may be any mathematical function configured to mix, flip, shift, swap, transform, add, replace, hash, and/or delete characters and/or bits. Information to alternatively and/or additionally complicate using a mathematical function, as shown at block 128, may be generated or derived from the network resources 22 in the same manner as described herein.

The additional encryption and/or data complication operations (blocks 126 and 128) may be performed on the non-encrypted data 68 prior to encryption using the encryption key 48 generated (e.g., derived) from the network resource 22 and/or may be performed on the encrypted data 70 following encryption using the encryption key 48 generated from the network resource 22.

Referring to FIG. 3, and with reference to FIG. 5, in one example implementation, transmitting the encrypted data 70 (block 108) may include transmitting the encrypted data 70 from the first computing device 12a (e.g., a transmitting computing device) to the second computing device 12b (e.g., a receiving computing device), for example, over the network 14. As one example, the encrypted data 70 may be transmitted via the communication interface 30 (FIG. 2) of the first computing device 12a. For example, the encrypted data 70 may be packetized (i.e., broken into packets) and designated for transmission (e.g., addressed) to the second computing device 12b over the network 14 by the communication interface 30 of the first computing device 12a.

Referring to FIG. 3, and with reference to FIG. 5, in one embodiment, the method 100 may include transmitting the network resource 22 (e.g., network-based resource or web-based resource), as shown at block 118. In one example implementation, the network resource 22, used to define, generate, and/or derive the encryption key 48, may be transmitted from the first computing device 12a to the second computing device 12b (e.g., shared with the second computing device 12b). As one example, transfer of the network resource 22 may be performed prior to transfer of the encrypted data 70 (e.g., block 108). As another example, transfer of the network resource 22 may be performed after transfer of the encrypted data 70 (e.g., block 108). As another example, transfer of the network resource 22 may be performed separately from transfer of the encrypted data 70 (e.g., block 108).

In one example implementation, the network resource 22 may be kept private (e.g., kept secret from unauthorized third-parties). As one example, the network resource 22 may be encrypted prior to being transmitted (e.g., shared) with the second computing device 12b, for example, using symmetric encryption or asymmetric encryption (e.g., public-key/private-key encryption).

In one example implementation, the network resource 22 may be transmitted (e.g., shared) from the user 20 of the first computing device 12a (e.g., a key-providing user) to the user 20 of the second computing device 12b (e.g., a key-receiving user). As one example, the network resource 22 may be provided to the key-receiving user directly by the key-providing user, for example, through an out-of-band communication.

Referring to FIG. 4, and with reference to FIG. 5, in one embodiment, the method 100 may include receiving the network resource 22 (network-based resource or web-based resource), as shown at block 130. In one example implementation, when the network resource 22 is encrypted prior to transmission, the network resource 22 may be decrypted following receipt.

As shown at block 132, the network resource 22 may be loaded into the decryptor 64, as shown at block 132. In one example implementation, the network resource 22 may be loaded and/or viewed on the web browser 52 of the second computing device 12b and the decryptor 64 may capture and/or load the network resource 22 from the web browser 52 in a substantially similar manner as described herein above and as shown at block 120.

As shown at block 134, the decryption key 49 may be generated (e.g., derived), by the second computing device 12b, from the network resource 22 for use to decrypt the encrypted data 70. Generating the decryption key 49 (also referred to as a second encryption key) from the network resource 22 (block 134) may be performed in whole or in part by the decryptor 64. In one example implementation, generating the decryption key 49 may include generating a decryption key 49 that is different than the encryption key 48 (e.g., the first encryption key and the second encryption key are different). In another example implementation, generating the decryption key 49 may include regenerating the encryption key 48 (e.g., the first encryption key and the second encryption key are the same). As one example, the decryption key 49 (e.g., the second encryption key) generated by the decryptor 64 may be the same as (e.g., match) the encryption key 48 (e.g., the first encryption key) generated by the encryptor 62. As another example, the decryption key 49 (e.g., the second encryption key) generated by the decryptor 64 may be an inverse of the encryption key 48 (e.g., the first encryption key) generated by the encryptor 62. As another example, the encryption key 48 (e.g., the first encryption key) may be asymmetric to the decryption key 49 (e.g., the second encryption key).

In one example embodiment, the CPU 24 may execute instruction provided by the encryption/decryption software 44 to generate the decryption key 49 defined by the network resource 22. As another example embodiment, the encryption/decryption module 60 may generate the decryption key 49 defined by the network resource 22. The decryption key 49 may specify the particular transformation of the encrypted data 70 (e.g., ciphertext) to the non-encrypted data 68 (e.g., plaintext) during a decryption operation.

As shown at block 136, the decryption key 49 may be loaded into decryptor 64. As one example, the decryption key 49 generated (e.g., derived) from the network resource 22 (e.g., network-based resource or web-based resource) by the decryptor 64 (block 134) may be automatically loaded into the decryptor 64.

In one example implementation, receiving the encrypted data 70 (block 110) may include receiving the encrypted data 70 by the second computing device 12b sent from the first computing device 12a, for example, over the network 14. As one example, the encrypted data 70 may be received via the communication interface 30 of the second computing device 12b. For example, the encrypted data 70 may be de-packetized by the communication interface 30 of the second computing device 12b.

Referring to FIG. 4, and with reference to FIGS. 5 and 7, the encrypted data 70 may be loaded into the decryptor 64, as shown at block 144. In one example implementation, decrypting the encrypted data 70 using the decryption key 49 (block 112) may include decoding the encrypted data 70 with the decryption key 49 using the exclusive or (XOR) decryption scheme 75, as shown at block 138, to generate the non-encrypted data 68 (e.g., decrypted data) (block 114).

Referring to FIG. 7, as one example, the XOR decryption scheme 75 used to decrypt the encrypted data 70 may include one or more bits of data (e.g., $b_{3,1}$-$b_{3,n}$) of the encrypted data 70 and one or more bits of data ($b_{2,1}$-$b_{2,n}$) of the decryption key 49 as input 80. The decryptor 64 may use the exclusive or (XOR) function to generate one or more bits of data ($b_{1,1}$-$b_{1,n}$) of the non-encrypted data 68 as output 82. The bits of data of the encrypted data 70 may be decrypted with the decryption key 49 bit-by-bit, in batches of bits, or as a bit stream.

Thus, the XOR decryption scheme 75 may provide a symmetric and single cycle computational operation to decrypt the encrypted data 70 using the decryption key 49 generated from the network resource 22.

Referring to FIG. 4, in one embodiment, the method 100 may include performing one or more alternative and/or additional decrypting and/or data complication reversing operations to undo the operations described at blocks 126 and/or 128.

In one example implementation, the encrypted data 70 and/or the non-encrypted data 68 may be alternatively and/or additionally decrypted using standard decryption (e.g., using an alternative and/or additional decryption algorithm), as shown at block 140 and may be generated or derived from the network resources 22 in the same manner as described herein. As one example, the standard decryption may include, but is not limited to, symmetric decryption (e.g., Advanced Encryption Standard (AES) or Data Encryption Standard (DES)), asymmetric decryption (e.g., public-key/private-key decryption), and/or any other type of decryption such as authentication decryption, or the like corresponding to the standard encryption described at block 126.

In one example implementation, the data complications of the encrypted data 70 and/or the non-encrypted data 68, as described at block 128, may be uncomplicated (e.g., the complications my be reversed) using an inverse of the mathematical function, as shown at block 142. As one example the mathematical function may be any mathematical function configured to mix, flip, shift, swap, transform, add, replace, hash, and/or delete characters and/or bits in order to reverse the operation shown at block 128. Information to uncomplicate the encrypted data 142 may be generated or derived from the network resources 22 in the same manner as described herein.

The additional decryption and/or data complication reversing operations (blocks 140 and 142) may be performed on the encrypted data 70 prior to decryption using the decryption key 49 generated (e.g., derived) from the network resource 22 and/or may be performed on the non-encrypted data 68 following decryption using the decryption key 49 generated from the network resource 22.

While the disclosed method 100 is described in terms of communicating (e.g., transmitting) encrypted data between two or more computing devices 12 (e.g., data in motion), those skilled in the art will recognize that the steps and/or operations described herein may also be implemented to communicate and store encrypted data on a storage device or other storage medium (e.g., a hard drive, a portable storage memory, an optical disc, server storage, cloud-based storage, and the like, e.g., data at rest) for long or short-term backup storage and retrieval of the encrypted data 70. The encrypted data 70 may be decrypted at the receiving computing device 12 or off of (e.g., from) the data storage device via the decryptor 64.

Since the selected network resource 22 used to generate the encryption key 48 and/or the decryption key 49 may change over time (e.g., the content of the web page 56 and/or the web-based data 58 may change or be removed), the network resource 22 may be stored in storage memory (e.g., memory 28 of the computing device 12 or another storage device). The network resource 22 may be encrypted, for example as described herein above, prior to storage.

Accordingly, the disclosed system 10, computing device 12 and method 100 may reduce processing overhead and time (e.g., processing power, cycle time and/or duration) needed to encrypt and/or decrypt a data as well as greatly increasing decryption difficulty.

Also disclosed herein are methods, systems and computer program products for generating a custom key for encrypting and decrypting digital content and for securely communicating the digital content, for example, between networked computing devices. As used herein, the term custom refers to an encryption or decryption key that is made distinctly or specially for one or more individual encryption/decryption operations.

Figure 8:
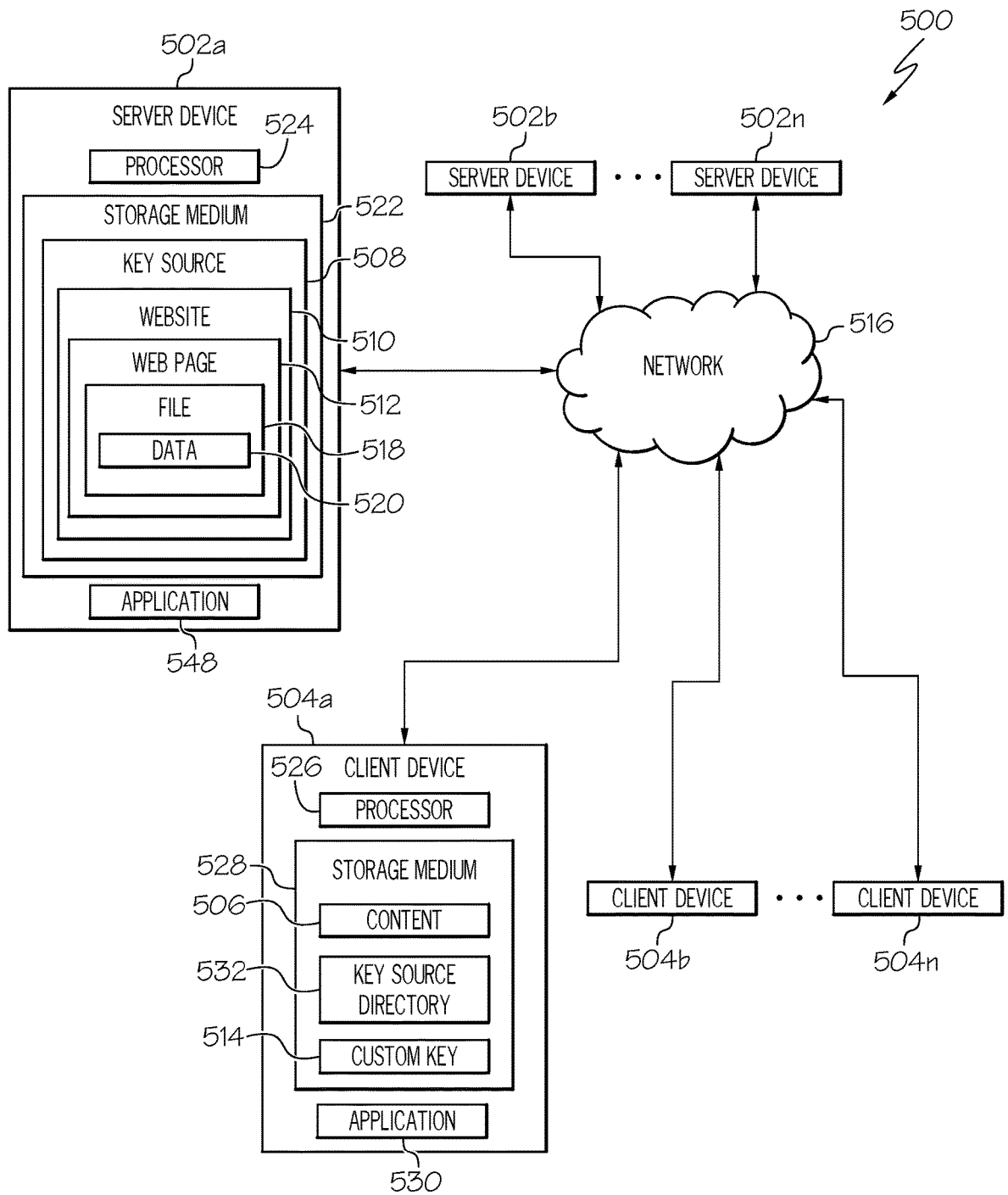
FIG. 8 is a schematic block diagram of one embodiment of an operating environment to securely communicate digital content.

Referring to FIG. 8, an example operating environment 500 includes one or more server devices 502a, 502b . . . 502n (also referred to collectively or individually as a server device(s) 502) and two or more client devices 504a, 504b . . . 504n (also referred to collectively or individually as a client device(s) 504) configured to generate a custom key 514 and securely communicate or otherwise share digital content 506 that is encrypted and decrypted using the custom key 514. The operating environment 500 also includes a network 516 that enables the server devices 502 and the client devices 504 to communicate with each other.

In an example, network 516 is an example of network 14 (FIG. 1). In some examples, server device 502 and client device 504 are any one of various types of network device or networked computing device (e.g., computing device 12 (FIG. 2)). In an example, server device 502 is an example of server device 18 (FIG. 1) and client device 504 is an example of client device 16 (FIG. 1). Although the example operating environment 500 illustrated in FIG. 8 includes three server devices 502 and three client devices 504, in other examples, the operating environment 500 may include any number of server devices 502 and/or any number of client devices 504. In other examples, the operating environment 500 may also include other servers and/or computing devices not illustrated in FIG. 8.

In some examples, a group of (e.g., two or more) client devices 504 is established for secure communication of the content 506 between member client devices 504 of the group. In some examples, a user (e.g., user 20 (FIG. 1)) or client device 504 may be a member of different groups at the same time. In an example, each member client device 504 of the group has, or has access to, the custom key 514. In an example, each member client device 504 of the group has, or has access to, a key source directory 532 that identifies at least one key source 508 to be used to generate the custom key 514. In an example, each member client device 504 of the group generates or derives the custom key 514 based on one or more key sources 508 identified by the key source directory 532. In an example, the content 506 to be shared between the member client devices 504 of the group is encrypted using the custom key 514. In an example, a message that includes the content 506 encrypted using the custom key 514 (e.g., encrypted content) by one member client device 504 of the group is delivered or otherwise communicated to one or more other member client devices 504 of the group. In an example, the other member client devices 504 of the group use the custom key 514 to decrypt the content 506 from the message.

In various examples, the content 506 includes any of various types of data or information to be shared or otherwise communicated by and between client devices 504. In an example, content 506 is an example of data 51 (FIG. 5). Examples of content 506 include, but are not limited to, emails, attachments in emails, documents, files, voice data (e.g., phone calls) text messages (e.g., instant messages, short message service (SMS) messages, multimedia message service (MMS) messages), text files, image files, audio files, video files, audio streams, video streams, social media information (e.g., posts), and any other types of content.

In an example, the server device 502 includes a processor 524 and a storage medium 522. In an example, the processor 524 is an example of the CPU 24 (FIG. 2) and the storage medium 522 is an example of the memory 28 (FIG. 2). In an example, the server device 502 is a web server that hosts one or more websites 510. In an example, the server device 502 constructs and displays the web page 512 using an application 548 (e.g., application software 42 (FIG. 2)). In an example, the server device 502 executes the application 548 to communicate through the network 516 with the client devices 504.

In an example, each website 510 includes one or more web pages 512. In an example, each web page 512 includes one or more digital files 518 and is configured for displaying a representation of the file 518. In an example, the information or content of each file 518 is formatted or characterized and, at least temporarily, stored on the storage medium 522 as a digital data 520, also referred to as data. The data 520 includes a sequence of discrete units of data that characterizes or describes the information or content of the file 518 using standard or non-standard digital encoding, formatting rules and/or protocols that can be interpreted by a computing device. In an example, the data 520 is a sequence of data having a fixed length, also referred to as a data block, such as the data 520 that digitally characterizes or represents a downloadable file 518. In an example, the data 520 is a steam of data, also referred to as a data stream, such as the streaming data 520 that digitally characterizes or represents a streaming file 518 (e.g., pre-recorded or live). In an example, the data 520 is a binary sequence. In an example, the data 520 is a sequence of bits. In an example, the data 520 is a steam of bits, also referred to as bitstream. In an example, the data 520 is a sequence of bytes. In an example, the data 520 is a stream of bytes, also referred to as a bytestream.

In an example, the server device 502 hosts one or more key sources 508. In an example, one or more key sources 508 are stored on the storage medium 522 of the server device 502. In other examples, the operating environment 500 also includes other servers and/or computing devices not illustrated in FIG. 8, such as other servers that host any content suitable for use as a key source 508. In an example, the key source 508 is an example of the network resource 22 (FIG. 5). In an example, the key source 508 includes all or some of the content published on the website 510. In an example, the key source 508 includes all or some of the content of one or more web pages 512 of the website 510. In an example, the key source 508 includes all of some of the content of one or more files 518 of the web page 512. In an example, the key source 508 includes all of some of the data 520 characterizing the file 518.

In an example, the website 510 includes a collection of related web pages 512, having multimedia content (e.g., text, audio, images, animations, video and interactive content), typically identified with a common domain name, and published on at least one web server. In various examples, the website 510 is any one of various websites available on a system of interconnected computer networks, for example, that use the Internet protocol suite (TCP/IP) to link devices.

In an example, the website 510 is any one of various websites published on the World Wide Web. In some examples, the website 510 is a personal website, a commercial website for a company, a government website, a non-profit organization website, a hidden website, or even a secure proprietary website.

In some examples, the website 510 includes a web page 512 having a file 518 configured to be used as a one-time pad (OTP). In some examples, the website 510 includes a web application operable (e.g., constructed or configured) to generate random content or to generate a file 518 characterized by truly random data 520 (e.g., a random binary sequence) or pseudo-random data 520 (e.g., a pseudo-random binary sequence), for example, using a deterministic algorithm. In some examples, the content of the file 518 (e.g., the data 520 characterizing the file 518) is variable and changes over time, for example, randomly or at a predetermined time standard.

In an example, the website 510 includes a quantum entanglement system configured to generate a random stream of quantum bits, also referred to as qubits or qbits. In an example, the quantum entanglement system is a two-state quantum mechanical system realized using the polarization of a single photon or other particle. In an example, the quantum bit has two polarization states—vertical polarization and horizontal polarization. Quantum mechanics allows a quantum bit to be in one state, the other state, or a superposition of both states at any given point in time. This physics process is known as quantum mechanical entanglement or quantum entanglement. In an example, the quantum entanglement system uses the effects of quantum entanglement to generate a completely random stream of quantum bits.

In various examples, the web page 512 contains any one or more of numerous types of information that is capable of being seen, heard or interacted with by the end user. Examples of the content of the web page 512 include, but are not limited to: textual information, such as documents or other text files; non-textual information, such as static images, animated images, audio files, video files, audio streams, video streams, and interactive information or media; and other information, such as metadata, style information, and functional scripts. In an example, the web page 512 is static (e.g., a static web page), in which the website 510 delivers web content (e.g., the file 518) exactly as stored in the file system of the server device 502. In an example, the web page 512 is dynamic (e.g., a dynamic web page), in which some or all of the web content (e.g., the file 518) is variable and changes, for example, when the web page 512 is reloaded, at a predetermined time or randomly. In an example, the dynamic web page is a server-side dynamic web page that is constructed and controlled by an application server processing server-side scripts or web applications. In an example, the dynamic web page is a client-side dynamic web page that is processed using client-side scripts or web applications.

In various examples, the file 518 is a computer resource for recording digital data discretely in a computer storage device. In some examples, the file 518 is any one of various different types of computer files, having different file formats and/or designated for different purposes. In an example, the file 518 is configured for downloading, in which the client device 504 obtains the entire file 518 before interacting with (e.g., viewing, watching, listening, etc.) the file 518. Examples of downloadable files include, but are not limited to, audio files, video files, text files, executable files, image files, graphics files, etc. As examples, downloadable files have any one of various file formats including, but not limited to, audio/video interleaved (.avi), cascading stylesheet (.css), word processing (.doc), executable file (.exe), graphics interchange format (.gif), hypertext markup language file (.html or .htm), joint photographic experts group file (.jpg or .jpeg) musical instrument digital interface (.midi or .mid), MPEG layer 3 sound file (.mp3), motion picture experts group file (.mpeg or .mpg), quicktime movie (.mov or .qt), portable document format (.pdf), portable network graphics (.png), real audio movie (.ram), RAR archive (.ram), tagged image file format (.tiff), text file (.txt), wave sound file (.wav), zipped file (.zip) and various other types of file formats.

In various examples, the file 518 is configured to be streamed (e.g., digitally encoded and transmitted as packets of data) from the server device 502 to the client device 504 (e.g., a streaming file), in which an application on the client device 504 (e.g., a web browser, media player, etc.) can interact with the file 518 (e.g., view, watch, listen, etc.) before the entire file 518 has been transmitted from the server device 502 or received by the client device 504. Examples of streaming files include, but are not limited to, streaming media, such as audio media (e.g., audio podcasts, audio on demand, etc.), video media (e.g., Youtube videos, video podcasts, video on demand, etc.), embedded multimedia and various other types of streaming media. Other examples of streaming files include, but are not limited to, streaming text, such as closed captioning, ticker tape, news crawl, and various other types of streaming information. Other examples of streaming files include live streaming files or real-time streaming data, in which text (e.g., live news crawl, live stock ticker, etc.), media (e.g., Internet radio, Internet television, live broadcasts) or other content is delivered in real-time (e.g., the content is recorded and broadcast simultaneously). As examples, steaming files or live-streaming files have any one of various file formats including, but not limited to, MPEG-4 part 14 (.mp4), flash video (.flv), MPEG layer 3 sound file (.mp3), synchronized multimedia integration language (.smil) and various other types of file formats that are supported by any one of various streaming protocols including, but not limited to, Adobe Flash Player, QuickTime, Dynamic Adaptive Streaming over HTTP (MPEG-DASH), Real Time Streaming Protocol (RTSP), Real-time Transport Protocol (RTP), MPEG-2 Transport Stream protocol (MPEG-2 TS) and various other types of protocols.

In an example, the client device 504 includes a processor 526 and a storage medium 528. In an example, the processor 526 is an example of the CPU 24 (FIG. 2) and the storage medium 528 is an example of the memory 28 (FIG. 2). The client device 504 accesses the web page 512 using an application 530 (e.g., application software 42 (FIG. 2)). In an example, the client device 504 executes the application 530 to communicate through the network 516 with the server device 502. In an example, the application 530 includes an Internet or web browser (e.g., web browser 52 (FIG. 5)) or other suitable application configured for communicating through the network 516 with the server device 502. In an example, the application 530 interacts with (e.g., downloads, streams, displays, etc.) content of the website 510, such as the web page 512, the file 518 and/or other applications hosted by the server device 502. In an example, the web page 512 published on the service device 502 can be accessed, viewed, loaded, downloaded, streamed or otherwise interacted with by the application 530 on the client device 504.

Figure 9:
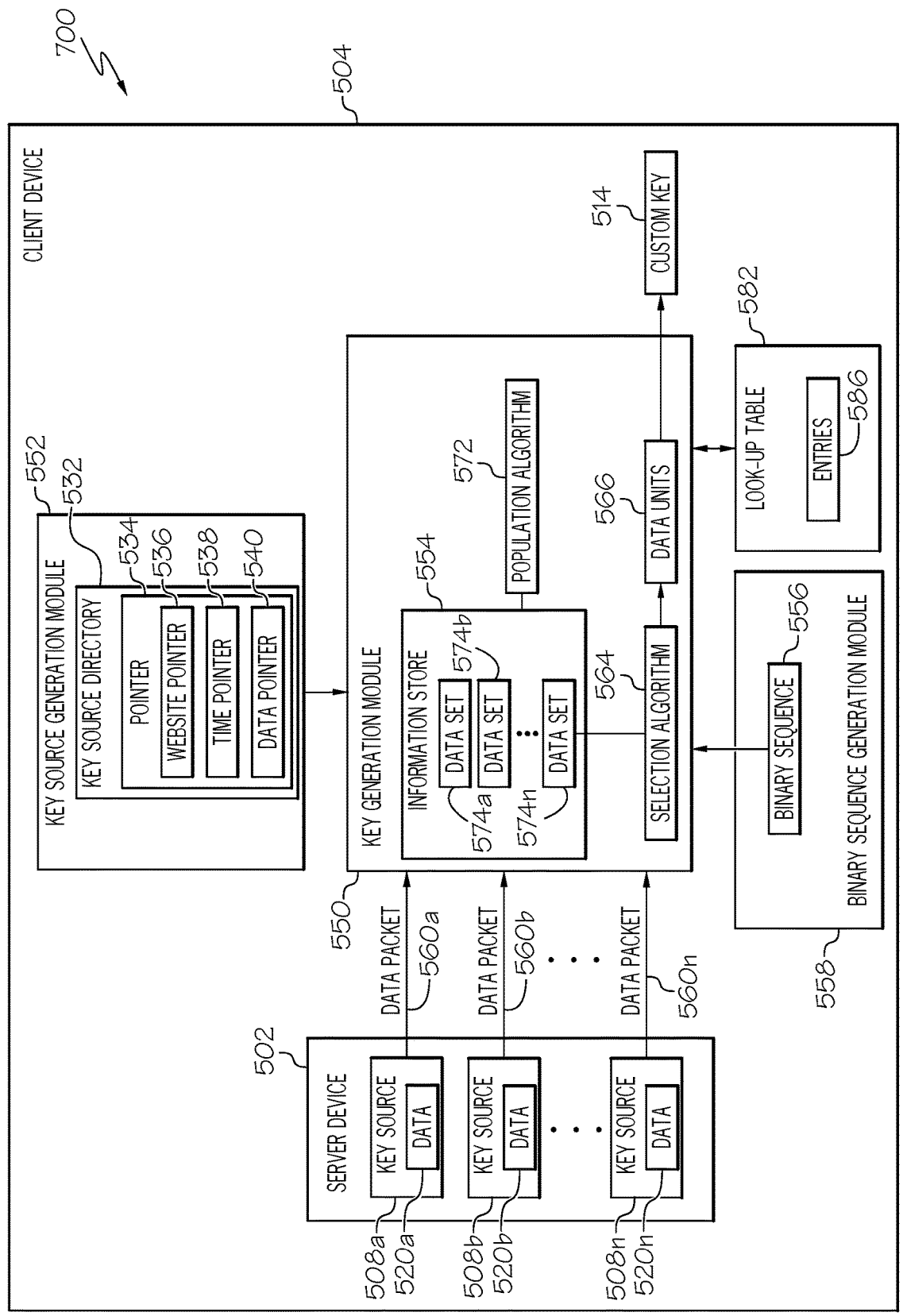
FIG. 9 is a schematic block diagram of one embodiment of a key generation process.

FIG. 9 is an example of a key generation process 700. In the example process 700, the client device 504 communicates with the server device 502. Although the example process 700 illustrated in FIG. 9 includes one server device 502 storing three key sources 508 and one client device 504, in other examples, the process 700 may include any number of server devices 502 storing any number of key sources 508 and/or any number of client devices 504 in communication with the server devices 502. In an example, the client device 504 generates or derives the custom key 514 from the plurality of the key sources 508a, 508b . . . 508n (also referred to collectively or individually as the key source(s) 508).

In an example, the client device 504 utilizes the key source directory 532 to identify the key sources 508 to be used for generating the custom key 514. In an example, the key sources 508 of the key source directory 532 are randomly selected. In an example, the key source directory 532 is generated or created manually, for example, by a user selecting the plurality of key sources 508. In an example, a key source generation module 552 on the client device 504 automatically generates the key sources 508. In an example, the key source generation module 552 is a special purpose application, a special purpose processor or a combination thereof operable to generate the key sources 508. In an example, the key source generation module 552 is an example of the application 530 (FIG. 8). In an example, the user or the client device 504 utilizes or communicates with a web application configured to select a random key source 508, such as a web-based application or website that randomly selects a random website from an index of websites.

In an example, the client device 504 accesses the key sources 508 and a key generation module 550 on the client device 504 receives the plurality of key sources 508 from the server device 502. In an example, the particular portion or portions of the website 510, the web page 512 or the file 518 defining the key sources 508 are transmitted as data packets 560a, 560b . . . 560n (also referred to collectively or individually as a data packet(s) 560). In an example, each of the key sources 508 is accessed individually and the associated data packets 560 are received in a consecutive or sequential manner, for example, as indicated by the key source directory 532. In an example, more than one key source 508 is accessed simultaneously and the associated data packets 560 are received concurrently.

In an example, the data packet 560 is a formatted unit of data carried by the network 516 (FIG. 8), which may also be referred to as a network packet. The data packet 560 includes a payload and various control information. In an example, the payload includes a particular portion or portions of the data 520 (e.g., a sequence of bits, a portion of a bitstream, etc.) identified as the key source 508 to be used for generating the custom key 514. In an example, the control information includes data for delivering the payload, for example, source and destination network addresses, error detection codes, and sequencing information. In an example, the control information also includes data stream identification information, such as a time stamp or a sequence stamp, that enables the key generation module 550 to properly order, sequence or otherwise organize the data 520 received in the data packets 560 regardless of the order in which the data packets 560 are received by the client device 504. In an example, the control information is found in the header and/or trailer of the data packet 560. In various examples, the data packets 560 have any one of various types of structure or format configured to be transmitted via any one of various communication protocols including, but not limited to, Transmission Control Protocol/Internet Protocol (TCP/IP), Real Time Protocol (RTP), RTP Control Protocol (RTCP), Real Time Streaming Protocol (RTSP), User Datagram Protocol (UDP) and any other communication protocol. In an example, the packetization operation or process of bundling portions of the data 520 into the data packet 560 is performed on the server-side. In an example, the packetizing operation or process of bundling portions of the data 520 into the data packet 560 is performed on the client-side.

In an example, the key generation module 550 is operable to generate an information store 554. In an example, the information store 554 is stored, at least temporarily, on the storage medium 528 of the client device 504 (FIG. 8). In an example, upon receiving the data packets 560 containing the data 520, the key generation module 550 populates the information store 554 with portions of the data 520 (e.g., as identified by the key source directory 532). In an example, the information store 554 is an index that organizes the retrieved portions of the data 520 according to respective key sources 508 identified by the key source directory 532. In an example, the information store 554 is a group of one or more pointers that points to the retrieved portions of the data 520 according to respective key sources 508 identified by the key source directory 532. In an example, the key generation module 550 formats or organizes the portions of the data 520 according to instructions provided to or provided by a population algorithm 572 executed by the key generation module 550.

In an example, the key generation module 550 is operable to select individual units of data 566, referred to herein as data units (e.g., a bits), from the portions of the data 520 populating the information store 554. In an example, the selected data units 566 are converted or arranged and used to form the custom key 514. In an example, the key generation module 550 selects particular data units 566 according to instructions provided to or provided by a selection algorithm 564 executed by the key generation module 550.

In an example, the key generation module 550 receives a binary sequence 556 that is utilized by the selection algorithm 564 to select the particular data units 566 used to form the custom key 514. In an example, the binary sequence 556 is a truly random binary sequence. In an example, the binary sequence 556 is a pseudo-random binary sequence. In an example, a binary sequence generation module 558 on the client device 504 generates the binary sequence 556. In an example, the binary sequence generation module 558 is a special purpose application, a special purpose processor or a combination thereof operable to generate the binary sequence 556. In an example, the binary sequence generation module 558 is an example of the application 530 (FIG. 8). In an example, the user or the client device 504 utilizes or communicates with a web application configured to generate a random binary sequence 556, such as a web-based application or website that randomly generates a binary sequence of a predetermined length. In an example, the binary sequence 556 is generated using a quantum entanglement system configured to generate a random binary sequence.

In an example, the key generation module 550 refers to a look-up table 582 that is utilized by the selection algorithm 564 to select the particular data units 566 used to form the custom key 514. In an example, the look-up table 582 includes a plurality of unit-selection entries 586, also referred to as entries. Each entry 586 of the look-up table 582 refers to one or more portions of the data 520 populating the information store 554.

In an example, the key generation module 550 generates the custom key 514 based on or derived from the data units 566 that are selected and extracted from the information store 554.

Figure 10:
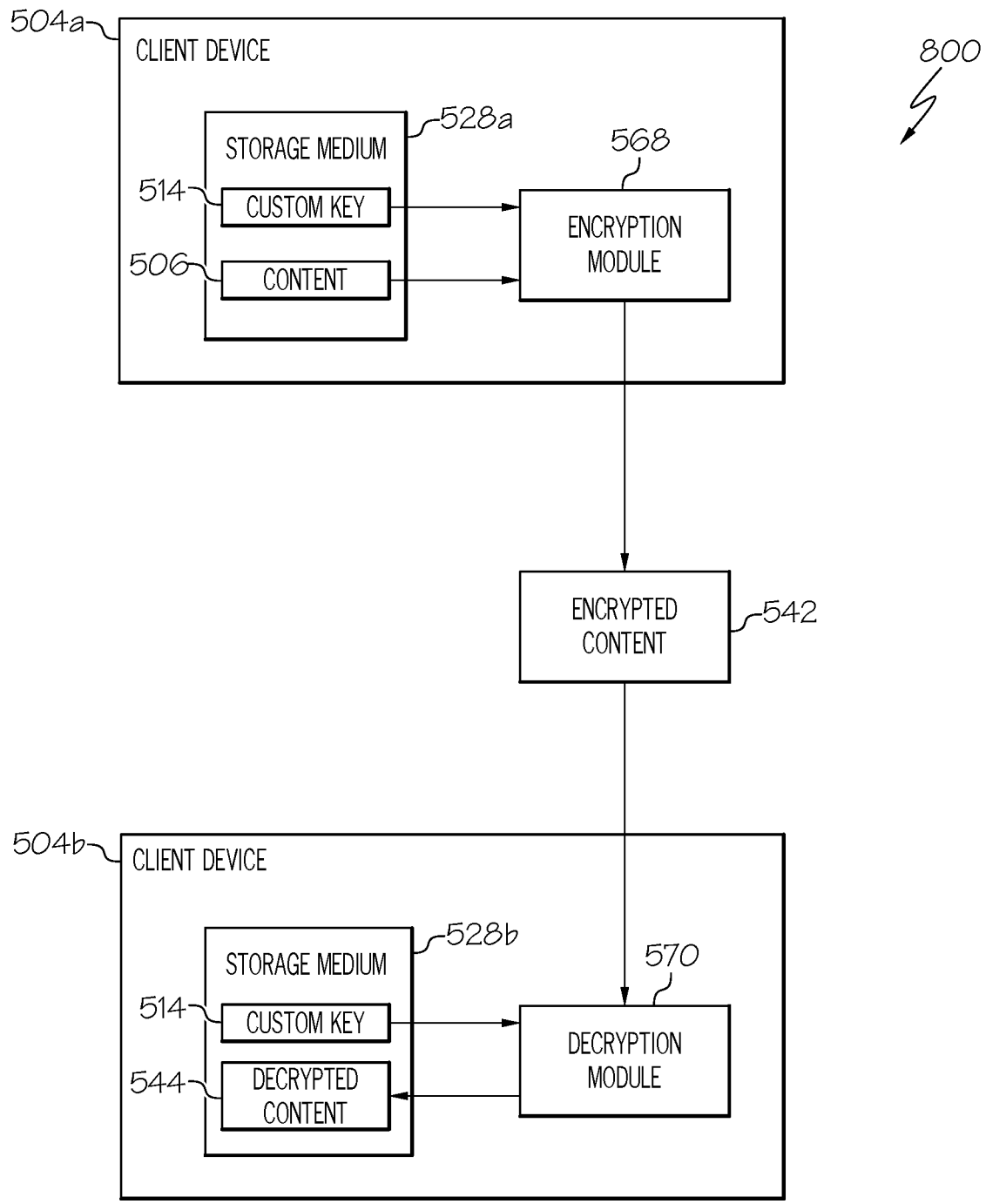
FIG. 10 is a schematic block diagram of one embodiment of an encryption and decryption process.

FIG. 10 is an example of an encryption and decryption process 800. In the example process 800, client device 504*a* encrypts the content 506 (i.e., unencrypted content) and sends (e.g., transmits, delivers, or otherwise communicates) a message containing the encrypted content 542 to client device 504*b*. In an example, each of the client devices 504*a* and 504*b* generate the custom key 514, for example, as described herein and illustrated in FIG. 9. In an example, the custom key 514 is stored, at least temporally, on a respective one of the storage mediums 528*a* and 528*b* of at least one of the client devices 504*a* and 504*b* to be available for use without the key generation module 550 (FIG. 9) first generating the custom key 514.

In an example, an encryption module 568 on the client device 504*a* is operable to encrypt the content 506 based on the custom key 514 using any one of various encryption techniques or encryption algorithms. The type of encryption performed may depend, for example, on the size of the custom key 514, the size of the content 506 being encrypted, the operational power of the client device 504*a*, the time available for encryption and other factors. In an example, the encryption algorithm is a simple function, such as an "exclusive or" function (e.g., the XOR encryption scheme 74 (FIG. 6)) or other functions. In an example, the encryption algorithm is a complex function, such as Advanced Encryption Standard (AES), Data Encryption Standard (DES), Rivest Shamir Adleman (RSA) or other functions. In an example, the encryption module 568 generates an encrypted message that includes the encrypted content 542 and sends the encrypted content 542 to the client device 504*b*. In some examples, the encrypted message additionally includes an information section that includes, for example, the key source directory 532 and the instructions for generating the custom key 514, as described herein. In some examples, the key source directory 532 and the instructions for generating the custom key 514 are sent to the client device 504*b* in another message that can also be encrypted. In some examples, the key source directory 532 and the instructions for generating the custom key 514 are provided to the client device 504*b* offline.

In an example, a decryption module 570 on the client device 504*b* is operable to decrypt the encrypted content 542 into decrypted content 544 based on the custom key 514 using any one of various decryption techniques or decryption algorithms. The type of decryption performed may depend, for example, on the size of the custom key 514, the size of the encrypted content 542 being decrypted, the operational power of the client device 504*b*, the time available for decryption and other factors. In an example, the decryption algorithm is a simple function, such as an "exclusive or" function (e.g., the XOR decryption scheme 75 (FIG. 7)) or other functions. In an example, the decryption algorithm is a complex function, such as Advanced Encryption Standard (AES), Data Encryption Standard (DES), Rivest Shamir Adleman (RSA) or other functions.

In an example, each of the client devices 504*a* and 504*b* generates the same custom key 514. In an example, each of the client devices 504*a* and 504*b* generates the same custom key 514 based on the same key source directory 532 identifying the same key sources 508, the same information store 554 populated using the same instructions for the population algorithm 572, the same binary sequence 556, and the same data units 566 selected using the same instructions for the selection algorithm 564 (FIG. 9). In an example, the custom key 514 is a private, symmetric key.

FIG. 11 illustrates an example of the key source directory 532 that identifies the plurality of key sources 508*a*, 508*b*, 508*c*, 508*d*, 508*e* . . . 508*n* (also referred to collectively or individually as the key source(s) 508). In an example, the key source directory 532 includes a plurality of key source identifiers (ID) 562*a*, 562*b*, 562*c*, 562*d*, 562*e* . . . 562*n* (also referred to collectively or individually as the key source ID(s) 562) that reference the key sources 508 used to generate the custom key 514. In an example, each one of the key sources 508 includes an associated key source ID 562. In an example, the key source ID 562 includes a numerical reference that provides or points to the order and/or position in which the data 520, which is retrieved from the key sources 508, are populated in the information store 554 (FIG. 9). In an example, the key generation module 550 populates the information store 554 based, at least in part, on the key source ID 562 and the time stamp or sequence stamp of the data packet 560 containing the data 520.

In an example, the key source directory 532 includes a plurality of pointers 534. The pointers 534 identify a particular portion or portions of the data 520 of the key sources 508. In an example, each key source 508 includes one or more pointers 534. In an example, the pointers 534 indicate a particular portion or portions of the website 510 to be used as the key source 508. In an example, the pointers 534 indicate a particular portion or portions of the web page 512 to be used as the key source 508. In an example, the pointers 534 indicate a particular portion or portions of the file 518 to be used as the key source 508. In an example, the pointers 534 indicate, index or otherwise identify a particular portion or portions of the data 520 (e.g., indicating the identified portion or portions of the file 518) to be used as the key source 508. The pointers 534 provide a reference point for retrieving a particular portion or portions of the data 520 to be used as the key source 508 for generating the custom key 514. As used herein, the term "particular" refers to a singled out, individual member of a specified group or class (e.g., websites, web pages, files, times, blocks of data, etc.) to be used for generating the custom key 514.

In an example, and as illustrated in FIG. 11, the pointers 534 include a plurality of website pointers 536*a*, 536*b*, 536*c*, 536*d*, 536*e* . . . 536*n* (also referred to collectively or individually as the website pointer(s) 536). In an example, each key source 508 includes one website pointer 536. In an example, the website pointer 536 indicates or references a particular website 510. In an example, the website pointer 536 indicates or references a particular web page 512 of the website 510. In an example, the website pointer 536 indicates or references a particular file 518 of the web page 512. In an example, the website pointer 536 includes a hostname, describing the website 510, and a file name, describing the web page 512 or the file 518.

In an example, the website pointer 536 is (or takes the form of) a Uniform Resource Locator (URL), also referred to as a web address, that references a web resource and specifies its location on the server device 502 or other host server on the network 516 (FIG. 8). In an example, the website pointer 536 takes the form of http://www.example1.com/index.html, which indicates a protocol (http), a hostname (www.example1.com) that indicates the website 510, and a file name (index.html) that indicates the web page 512 or file 518 (e.g., the text file defining the web page). In an example, the website pointer 536 takes the form of http://www.example2.com/document.pdf, which indicates a protocol (http), a hostname (www.example2.com) that indicates the website 510, and a file name (document.pdf) that indicates the file 518 (e.g., a text file). In an example, the website pointer 536 takes the form of http://www.example3.com/audio.mp3, which indicates a protocol (http), a hostname (www.example3.com) that indicates the website 510, and a file name (audio.mp3) that indicates the file 518 (e.g., an audio file). In an example, the website pointer 536 takes the form of http://www.example4.com/video.mpg, which indicates a protocol (http), a hostname (www.example4.com) that indicates the website 510, and a file name (video.mpg) that indicates the file 518 (e.g., a video file). In an example, the website pointer 536 takes the form of http://www.example5.com/image.jpg, which indicates a protocol (http), a hostname (www.example5.com) that indicates the website 510, and a file name (image.jpg) that indicates the file 518 (e.g., an image file). In an example, the website pointer 536 takes the form of http://www.example6.com/watch+videoID, which indicates a protocol (http), a hostname (www.example6.com) that indicates the website 510, and a file name (watch+videoID) that indicates the file 518 (e.g., a streaming video file). In an example, the website pointer 536 takes the form of http://www.example7.com/embed+livestream, which indicates a protocol (http), a hostname (www.example5.com) that indicates the website 510, and a file name (embed+livestream) that indicates the file 518 (e.g., a real-time (i.e., live) streaming video). In other examples, the website pointer 536 includes any other type or format that references or indicates the hostname and/or file name of a web resource or other web content, for example, hosted by server device 502 or other servers in the network 516 (FIG. 8).

In an example, and as illustrated in FIG. 11, the pointers 534 include a plurality of time pointers 538a, 538b, 538c, 538d . . . 538n (also referred to collectively or individually as the time pointer(s) 538) that indicate a reference time standard for accessing the key source 508 and retrieving the data 520. In an example, one or more key sources 508 include the time pointer 538. In an example, the time pointer 538 references one time standard (e.g., time pointer 538a for key source 508a and time pointer 538c for key source 508c). In an example, the time pointer 538 references more than one time standard (e.g., time pointer 538b for key source 508b and time pointer 538d for key source 508d). In an example, one or more key sources 508 do not include a time pointer 538 (e.g., key source 508e). In an example, the time pointer 538 indicates a particular time for accessing or loading the website 510, web page 512 and/or file 518 (indicated by the website pointer 536 associated with the time pointer 538) at which the data 520 is retrieved. In an example, the time pointer 538 indicates a predetermined time period or time interval during which the data 520 is retrieved.

In an example, the time pointer 538 is a Universal Time (UT) time standard, such as Coordinated Universal Time (UTC), UT0, UT1, UT1R or UT2. In an example, the time pointer 538 is a Society of Motion Picture and Television Engineers (SMPTE) time code. In other examples, the time pointer 538 includes any other type or format that references or indicates a reference time at which the key source 508 is accessed and/or the data 520 is retrieved.

In an example, the time pointer 538a indicates or references a particular time of day (e.g., 03:15:42 AM) in which the key source 508a is accessed and the data 520 from the key source 508a is retrieved. In an example, the time pointer 538b indicates or references two different particular times of day (e.g., 03:15:42 AM and 01:28:35 PM) in which the key source 508b is accessed and the data 520 from the key source 508b is retrieved. In an example, the time pointer 538c indicates or references a particular time point (e.g., 01:08:59:28) in an audio stream or video stream in which the key source 508c is accessed and the data 520 from the key source 508c is retrieved. In an example, the time pointer 538d indicates or references a particular starting time point (e.g., 00:12:06:45) and a particular ending time point (e.g., 01:08:59:28) in an audio stream or video stream in which the key source 508d is accessed and the data 520 from the key source 508d is retrieved. In other non-illustrated examples, the time pointer 538 combines different types or formats to reference the time standard for accessing the key source 508 and retrieving the data 520. In an example, the time pointer 538 indicates or references a particular time of day (e.g., 03:15:42 AM) in which the key source 508 is accessed and a particular time point (e.g., 01:08:59:28) in an audio stream or video stream in which the data 520 from the key source 508b is retrieved.

In an example, the time pointers 538 are utilized with dynamic key sources 508 in which the data 520 is variable or changes at different times of the day, for example, dynamic web pages 512 in which the web content of the file 518 changes. In an example, the key source directory 532 instructs the key generation module 550 to access the key source 508 at a particular time to retrieve the data 520. In an example, the time pointers 538 are utilized with key sources 508 in which the data 520 varies over time, for example, media files or streaming files. In an example, the key source directory 532 instructs the key generation module 550 to access the key source 508 at a particular reference time point to retrieve the data 520. In an example, the time pointers 538 are utilized with key sources 508 that are available at a particular time and in which the data 520 varies over time, for example, live streaming files. In the examples of dynamic web pages and/or live streaming files, the time pointer can indicate a time in the future, for example, before the key source 508 is created or otherwise available.

In an example, and as illustrated in FIG. 11, the pointers 534 include a plurality of data pointers 540a, 540b, 540c, 540e . . . 540n (also referred to collectively or individually as the data pointer(s) 540) that indicate or reference a particular portion or portions of the data 520 to be used for generating the custom key 514. In an example, one or more key sources 508 include the data pointer 540. In an example, the data pointer 540 indicates or references a portion or portions of the data 520 designated for use in generating the custom key 514. In an example, the designated portion of the data 520 includes a binary sequence consisting of a predetermined number of bits (b) or bytes (B) taken from the data 520. In an example, the data pointer 540 references one or more bits of the data 520 (e.g., the data pointer 540a for key source 508a and the data pointer 540e for key source 508e). In an example, the data pointer 540 references one or more bytes of the data 520 (e.g., the data pointer 540b for key source 508b). In an example, the data pointer 540 references a number of bits (e.g., the data pointer 540c for key source 508c). In an example, one or more key sources 508 do not include a data pointer 540 (e.g., key source 508d).

In an example, the data pointer 540 (FIG. 11) indicates or references a particular set of bits of the data 520 of the key source 508. In an example, the data pointer 540 indicates or references a starting bit and an ending bit. In an example, the data pointer 540a and the data pointer 540e indicate the $3^{rd}$ bit (b3) of the data 520 as a starting bit and the $19^{th}$ bit (b19)

of the data 520 as an ending bit. In an example, the data pointer 540 indicates or references more than one set of bits of the data 520 in which each set of bits is identified by a starting bit and an ending bit (e.g., b3-b19 and b52-b60). In an example, the data pointer 540 indicates or references a particular byte of the data 520 of the key source 508. In an example, the data pointer 540*b* indicates the 5$^{th}$ byte (B5) of the data 520. In an example, the data pointer 540 indicates or references a particular set of bytes of the data 520 of the key source 508. In an example, the data pointer 540 indicates or references a starting byte and an ending byte (e.g., B5-B8). In an example, the data pointer 540 indicates or references more than one set of bytes of the data 520 in which each set of bytes is identified by a starting byte and an ending byte (e.g., B5-B8 and B21-B24). In an example, the data pointer 540 indicates or references one or more sets of bits and one or more sets of bytes of the data 520 in which each set of bits is identified by a starting bit and an ending bit (e.g., b3-b19 and b52-b60) and in which each set of bytes is identified by a starting byte and an ending byte (e.g., B5-B8 and B21-B24). In an example, the data pointer 540 indicates or references a particular number of bits or bytes of the data 520. In an example, the data pointer 540*c* indicates 24 bits (24 b) of the data 520. In other examples, the data pointer 540 includes different combinations of particular bits and/or bytes.

In some examples, the time pointer 538 and the data pointer 540 cooperate or are used in combination to identify or reference the particular portion or portions of the data 520, to be used for generating the custom key 514. In an example, the key source 508 is accessed at a designated time (e.g., a particular time of day or a particular point in time of a media stream), as indicated by the time pointer 538, and a designated portion of the data 520 (e.g., a particular set of bits and/or bytes), as indicated by the data pointer 540, is retrieved from the data 520 at the designated time. In an example, the time pointer 538*a* references a designated time (e.g., 03:15:42 AM) to access the key source 508*a* and the data pointer 540*a* references a designated portion of the data 520 (e.g., b3-b19) to be retrieved and used for generating the custom key 514. In an example, the time pointer 538*c* references a designated time (e.g., a time point of 01:08:59:28 in the media stream) of the key source 508*c* and the data pointer 540*c* references a designated portion of the data 520 (e.g., 24*b*) to be retrieved and used for generating the custom key 514. In an example, the key source 508 is accessed at more than one designated times (e.g., particular times of day), as indicated by the time pointer 538, and a designated portion of the data 520 (e.g., a particular set of bits and/or bytes), as indicated by the data pointer 540, is retrieved from the data 520 at the designated times. In an example, the time pointer 538*b* references two designated times (e.g., 03:15:42 AM and 01:28:35 PM) to access the key source 508*b* and the data pointer 540*b* references a designated portion of the data 520 (e.g., B5) to be retrieved and used for generating the custom key 514. In other examples, any other combination of the time pointer 538 and the data pointer 540 is used to identify the designated time standard for accessing the key source 508 and identify the designated portion of the data 520 for use in generating the custom key 514.

Figure 12:
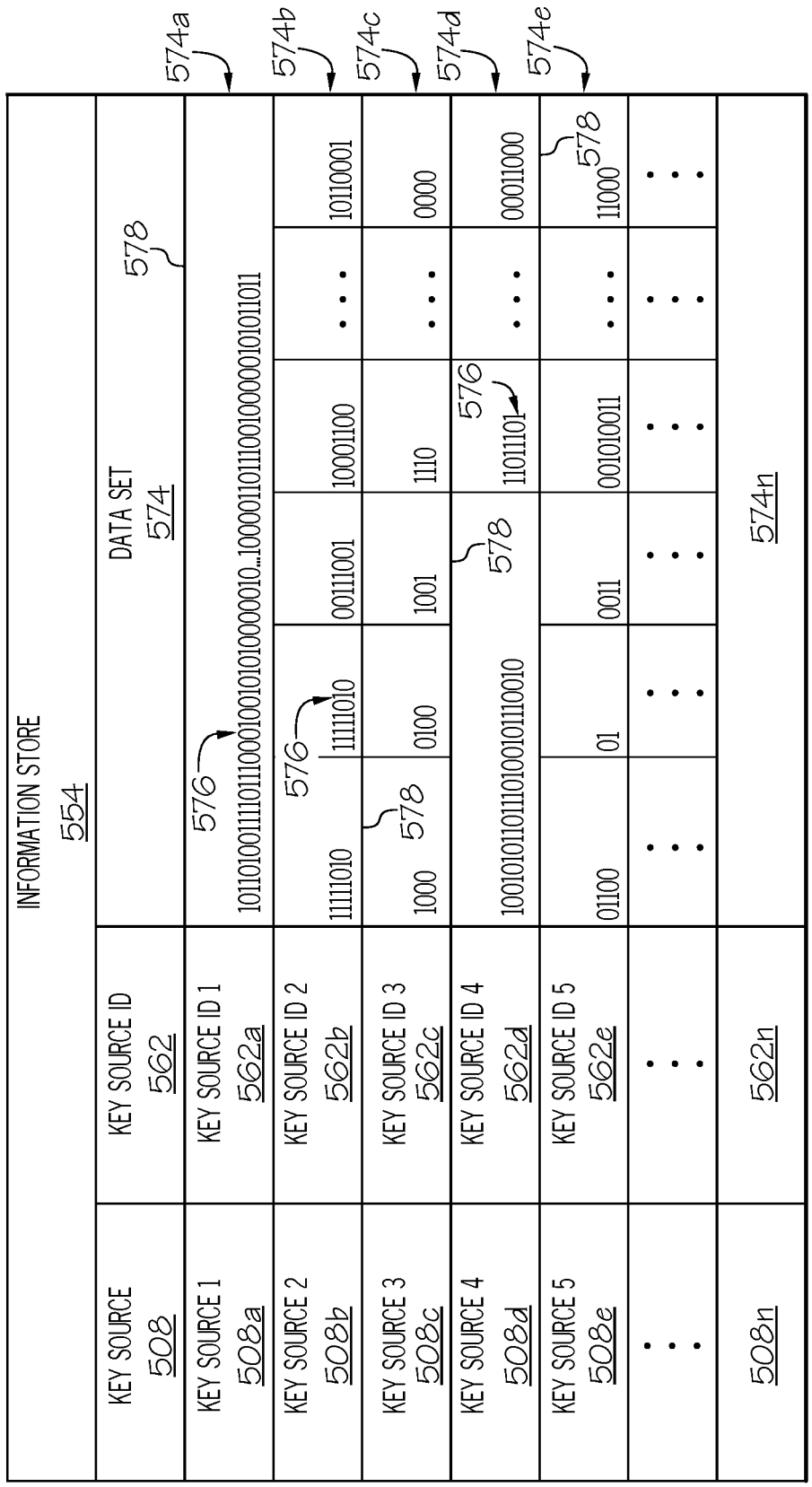
FIG. 12 is a schematic illustration of one embodiment of an information store used in the key generation process.

FIG. 12 illustrates an example of the information store 554 that is populated with the portions of the data 520 of the key sources 508, as indicated in or referenced by the key source directory 532 (FIG. 11). In an example, the information store 554 includes the plurality of key source IDs 562 referencing the key sources 508. In an example, the information store 554 also includes a plurality of sets of data 574*a*, 574*b*, 574*c*, 574*d*, 574*e* . . . 574*n* (also referred to collectively or individually as a data set(s) 574). In an example, each data set 574 includes the portion or portions of the data 520 of the respective key source 508 selected for generating the custom key 514. In an example, the data set 574 is a sequence of discrete units of data 576, also referred to as data units. In an example, the data set 574 is a sequence of bits. In an example, the data set 574 is a binary sequence.

In some examples, the data sets 574 corresponding to the key sources 508 are formatted or otherwise organized in the information store 554 in any one of various ways. In an example, the data sets 574 are arranged into rows. In an example, the data sets 574 are arranged into columns. In an example, the data sets 574 are arranged into rows and columns. In an example, the data set 574 is broken into or otherwise subdivided into blocks of units of data 578, also referred to as data blocks. In an example, the data block 578 includes the entire data set 574 retrieved from the key source 508. For example, the entire data set 574*a* is arranged in a single data block 578. In an example, the data blocks 578 include the same number (e.g., predetermined or randomly generated) of data units 576 of the data set 574. For example, the data set 574*b* is divided into data blocks 578 each containing eight (8) data units 576 (e.g., a byte of data) and the data set 574*c* is divided into data blocks 578 each containing four (4) data units (e.g., four bits). In an example, the data blocks 578 include different numbers (e.g., predetermined or randomly generated) of data units 576 of the data set 574. For example, the data set 574*e* is divided into data blocks 578 each containing a different number of data units 576 (e.g., two data units, four data units, five data units, etc.). In an example, the data blocks 578 include a portion of the data set 574 corresponding to portions of the data 520 referenced by specific pointers 534 of the key source directory 532 (FIG. 11). For example, the data set 574*d* is divided into data blocks 578 each containing a portion of the data 520 designated by a particular time pointer 538, data pointer 540 or combination of time pointer 538 and data pointer 540. In other examples, the data sets 574 are organized or arranged in any other format or tabular form.

Figure 13:
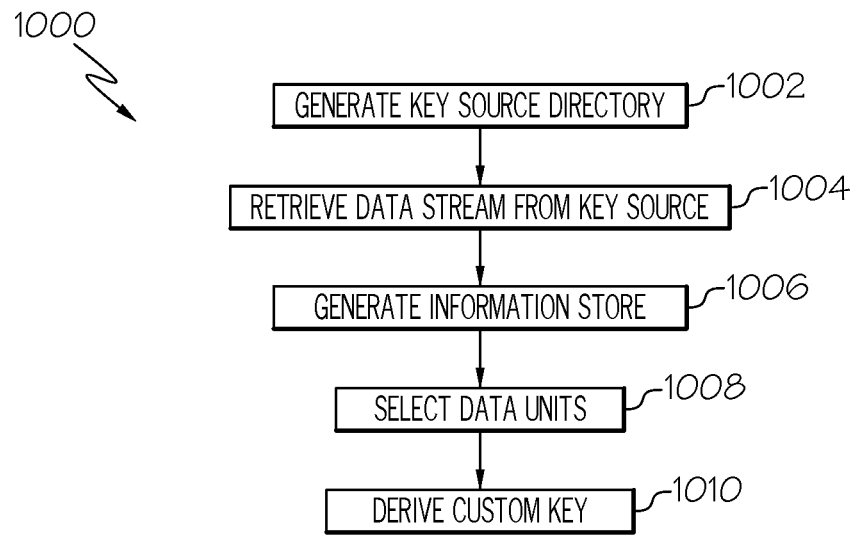
FIG. 13 is a flow diagram of one embodiment of the disclosed method for generating a custom key for encrypting and decrypting digital content.

FIG. 13 is a flow diagram of an example method 1000 for generating the custom key 514 used to encrypt and decrypt the content 506. In some examples, the method 1000 is performed in whole or in part by any of the client devices 504 (FIG. 8). In some examples, the method 1000 is performed in part by any of the client devices 504 and in part by any of the server devices 502 (FIG. 8). In an example, the method 1000 represents aspects of the key generation process 700 of FIG. 9.

In an example, the method 1000 includes a step of generating the key source directory 532 (e.g., FIG. 11), as shown at block 1002. In an example, the key source directory 532 is created manually. For example, a user selects the key sources 508 and generates the key source directory 532. In an example, the key source directory is created automatically. For example, a special purpose application (e.g., the key source generation module 552) selects the key sources 508 and generates the key source directory 532. In an example, websites 510, web pages 512, files 518 or other web content are selected as the key sources 508 and are designated or identified by the website pointers 536. In an example, particular portions of the data 520 representing each key source 508 (e.g., website 510, web page 512, and/or file 518) in its digital form are selected as the data sets 574 and are designated or identified by one or more time pointers 538 and/or data pointers 540.

In an example, the method 1000 includes a step of retrieving the designated portions of the data 520 from the associated key sources 508 (FIG. 9), as shown at block 1004. In an example, the key source 508, on the server device 502 (FIG. 8), is accessed (e.g., to be downloaded or streamed) and all of the data 520 (e.g., the entire file 518 (FIG. 8)) representing the key source 508 is stored, at least temporarily, on the storage medium 528 of the client device 504 (FIG. 8) and the data set 574, the particular portion(s) of the data 520 indicated by the key source directory 532, is retrieved from the data 520. In an example, the key source 508, on the server device 502, is accessed and only the designated portions of the data 520 identified by the key source directory 532 as the data set 574 is stored, at least temporarily, on the storage medium 528 of the client device 504. In an example, conversion of the key source 508 to its digital form represented by the data 520 is performed on the server-side. In an example, conversion of the key source 508 to its digital form represented by the data 520 is performed on the client-side.

In an example, the method 1000 includes a step of generating the information store 554 (FIG. 12), as shown at block 1006. In an example, the information store 554 is generated by arranging the data sets 574 (FIG. 12) in tabular form. In an example, the information store 554 is generated based on instructions, for example, provided to or provided by the population algorithm 572 (FIG. 9).

In an example, the method 1000 includes a step of selecting individual data units 576 (FIG. 12) of the data sets 574 populating the information store 554, as shown at block 1008. In an example, the selected data units 576 of the data sets 574 are used as the data units 566 that become the custom key 514 (FIG. 9). In an example, the data units 576 of the data sets 574 are selected randomly. In an example, the data units 576 are selected based on instruction, for example, provided to or provided by the selection algorithm 564 (FIG. 9). In an example, a special purpose application (e.g., the key generation module 550) selects particular ones of the data units 576 based on predetermined instructions.

In an example, the step of selecting individual data units 576 includes a step of generating the binary sequence 556 and using the binary sequence 556 (FIG. 9), for example, based on instructions provided by or provided to the selection algorithm 564, to select the data units 576 that will become the data units 566 forming the custom key 514 (FIG. 9).

In an example, the step of selecting individual data units 576 includes a step of generating and/or receiving the look-up table 582 (FIG. 9) and using the look-up table 582, for example, based on instructions provided by or provided to the selection algorithm 564, to select the data units 576 that will become the data units 566 forming the custom key 514 (FIG. 9).

In an example, the method 1000 includes a step of deriving the custom key 514 (FIG. 9), as shown at block 1010. In an example, the custom key 514 is derived, or generated, by arranging the data units 566 (e.g., the data units 576 selected from the taken from the data sets 574 of the information store 554) (FIG. 9) to form the custom key 514. In an example, the data units 566 are arranged in the order in which they are selected from the information store 554 (FIG. 9) to form the custom key 514. In an example, the data units 566 are rearranged following selection from the information store 554. In some examples, one or more of the data units 566 are swapped with one or more different data units 566. In some examples, some or all of the data units 566 are mixed. In some examples, one or more pairs of data units are flipped.

Figure 14:
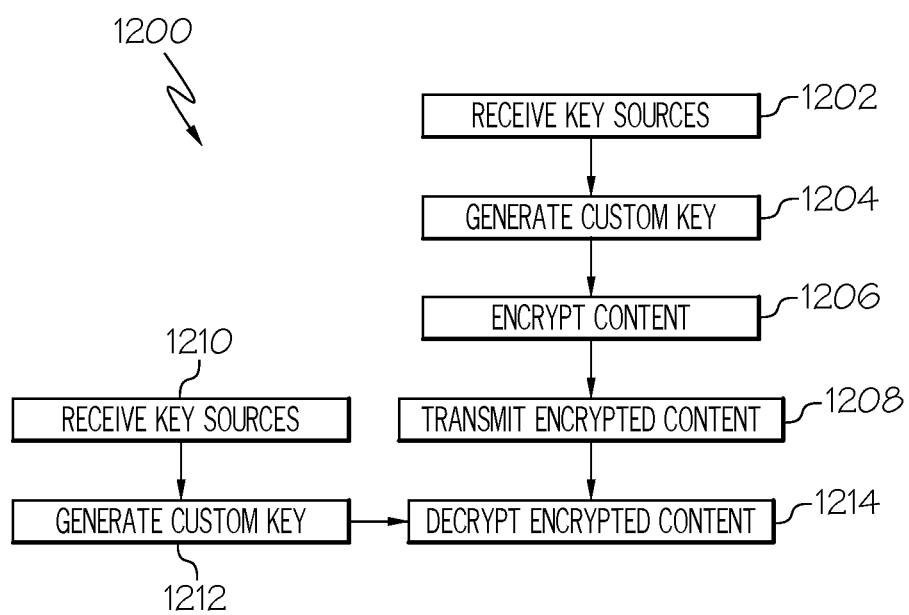
FIG. 14 is a flow diagram of one embodiment of the disclosed method for securely communicating digital content.

FIG. 14 is a flow diagram of an example method 1200 for securely communicating the content 506. In some examples, the method 1200 is performed in whole or in part by any of the client devices 504 (FIG. 8). In some examples, the method 1200 is performed in part by any of the client devices 504 and in part by any of the server devices 502 (FIG. 8). In an example, the method 1200 represents aspects of the encryption and decryption process 800 of FIG. 10.

In an example, the method 1200 includes a step of receiving the key sources 508, as shown at block 1202. In an example, the client device 504a, associated with encrypting the content 506 (FIG. 10), generates or receives the key source directory 532 identifying the key sources 508.

In an example, the method 1200 includes a step of generating the custom key 514, as shown at block 1204. In an example, the custom key 514 is generated according to the processes and operations described in the process 700 (FIG. 9) and the method 1000 (FIG. 13).

In an example, the method 1200 includes a step of encrypting the content 506 using the custom key 514, as shown at block 1206. In an example, the content 506 that is encrypted using the custom key 514 is communicated or shared between member client devices 504a and 504b of the group (FIG. 10).

In an example, the method 1200 includes a step of transmitting the encrypted content 542, as shown at block 1208. In an example, client device 504a generates a message containing the encrypted content 542 and sends the message to the client device 504b, associated with decrypting the encrypted content 542 (FIG. 10).

In an example, the method 1200 includes a step of receiving the key sources 508, as shown at block 1210. In an example, the client device 504b, associated with decrypting the encrypted content 542 (FIG. 10), generates or receives the key source directory 532 identifying the key sources 508. To maintain secrecy of the custom key 514, the key sources 508 are only known to the client devices 504a and 504b of the group. In an example, the key source directory 532 is transmitted, provided, or otherwise relayed to the client device 504b separately from the message containing the encrypted content 542. In an example, the key source directory 532 is encrypted prior to being provided to the client device 504b. In various examples, the key source directory 532 is encrypted by any one of various encryption techniques, such as a public-key encryption scheme (e.g., public key cryptography or asymmetrical cryptography) using public key infrastructure (PKI), a private-key encryption scheme (e.g., private key cryptography or symmetrical cryptography) or any other known encryption technique.

In an example, the method 1200 includes a step of generating the custom key 514, as shown at block 1212. In an example, the custom key 514 is generated according to the processes and operations described in the process 700 (FIG. 9) and the method 1000 (FIG. 13). To maintain secrecy of the custom key 514, the instructions utilized to generate the information store 554 (e.g., the population algorithm 572 and/or the instructions provided to the population algorithm 572) and the instructions for selecting the data units 566 to be used as the custom key 514 (e.g., the selection algorithm 564 and/or the instructions provided to the selection algorithm 564) are only known to the client devices 504a and 504b of the group. In an example, the instructions are transmitted, provided, or otherwise relayed to the client device 504b separately from the message containing the encrypted content 542. In an example, the instructions are encrypted prior to being provided to the client device 504b. In various examples, the instructions are encrypted by any one of various encryption techniques, such as a public-key encryption scheme (e.g., public key cryptography or asymmetrical cryptography) using public key infrastructure (PKI), a private-key encryption scheme (e.g., private key cryptography or symmetrical cryptography) or any other known encryption technique.

In an example, the method 1200 includes a step of decrypting the encrypted content 542 using the custom key 514, as shown at block 1214.

Figure 15:
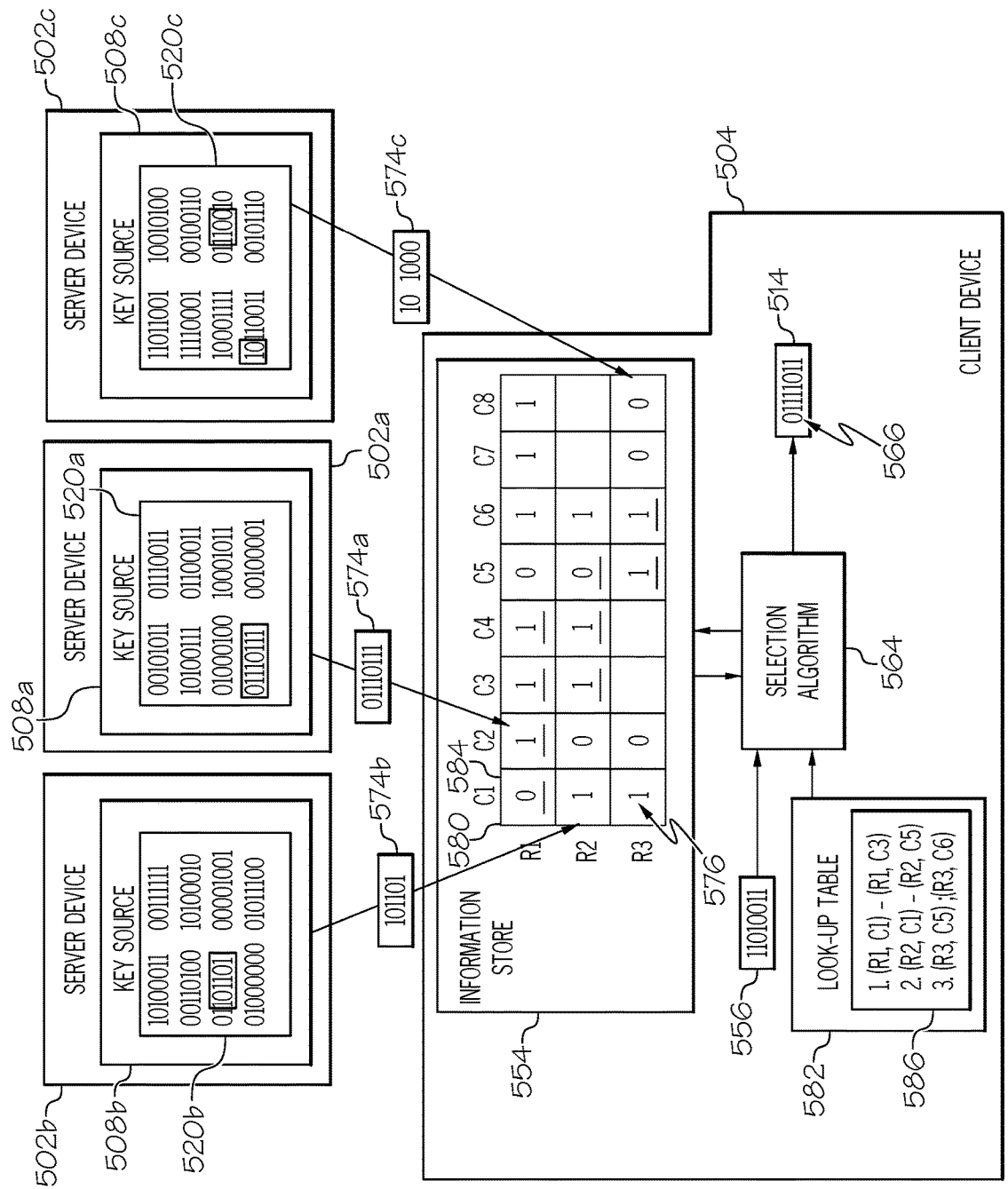
FIG. 15 is a schematic block diagram illustrating an example of the method for generating a custom key.

FIG. 15 illustrates an example implementation of a portion of the disclosed method 1000 (FIG. 13). In an example, key sources 508a, 508b and 508c, located on server devices 502a, 502b, and 502c, are used as the sources for respective data 520a, 520b and 520c (also referred to collectively or individually as the data 520). In an example, each key source 508 is a website 510, web page 512, and/or file 518, for example, as indicated in the key source directory 532 and designated by the website pointer 536 (FIG. 11). Although the example implementation illustrated in FIG. 15 includes only three key sources 508, in other examples any number of key sources 508 may be used. In some examples, there is no limit on the number of key sources 508 that can be used. In an example, the number of key sources 508 depends on the size of the custom key 514 to be generated, the size of the content 506 to be encrypted and/or decrypted, and other parameters. Although the example implementation illustrated in FIG. 15 includes data 520 consisting of sixty-four (64) units of data (e.g., eight (8) bytes of data), in other examples the data 520 may have any number of units of data (e.g., bits of data). For example, the data 520 can be of any size or of any length. In some examples, there is no limit to the size of the data 520. In an example, the size of the data 520 depends on the size of the custom key 514 to be generated, the size of the content 506 to be encrypted and/or decrypted, the type of file 518, and other parameters.

In an example, the data 520 (e.g., a downloadable file 518 (FIG. 8)) is transmitted from the server device 502 to the client device 504, for example, as data packets 560 (FIG. 9) and is stored (e.g., downloaded), at least temporarily, on the storage medium 528 of the client device 504 (FIG. 8). The data set(s) 574, representing the designated portion(s) of the data 520 as indicated by the key source directory 532 (FIG. 11), is extracted from the data 520 to populate the information store 554. In an example, the data 520 (e.g., a streaming file 518) is transmitted (e.g., streamed) from the server device 502 to the client device 504, for example, as data packets 560 (FIG. 9). The data set(s) 574, representing the designated portion(s) of the data 520 as indicated by the key source directory 532, is extracted from the streaming data 520 (e.g., as the streaming data 520 is received by the client device 504) to populate the information store 554. In an example, the data 520 (e.g., the file 518), stored on the server device 502, is accessed by the client device 504 and the data set(s) 574, representing the designated portion(s) of the data 520 as indicated by the key source directory 532, is extracted from the data 520 and is stored (e.g., downloaded), at least temporarily, on the storage medium 528 of the client device 504 (FIG. 8) to populate the information store 554.

In an example, and as illustrated in FIG. 15, the data sets 574a, 574b and 574c are retrieved from the data 520 of the respective key sources 508a, 508b and 508c. In an example, each data set 574 includes a particular portion or portions of the respective data 520, for example, as indicated in the key source directory 532 and designated by the pointers 534 (e.g., as designated by the website pointer 536, the time pointer 538 and/or the data pointer 540) (FIG. 11). Although the example implementation illustrated in FIG. 15 includes data sets 574 consisting of between two (2) units of data (e.g., bits) and eight (8) units of data, in other examples the data sets 574 may have any number data units. For example, the data sets 574 can be of any size or of any length. In some examples, there is no limit to the size of the data set 574. In an example, the size of the data set 574 depends on the size of the custom key 514 to be generated, the size of the content 506 to be encrypted and/or decrypted, the size of the data 520, and other parameters.

In an example, the information store 554 is populated with the data sets 574 extracted from the data 520. In an example, the information store 554 arranges the data sets 574 into rows and columns. In other examples, the data sets 574 are arranged or indexed into any one of various other formats. Although the example implementation illustrated in FIG. 15 includes the information store 554 consisting of three (3) rows and eight (8) columns, in other examples, the information store 554 includes any number of rows and/or any number of columns, depending, for example, on the number of key sources 508, the size of the custom key 514 to be generated, the size of the content 506 to be encrypted and/or decrypted, the sizes of the data sets 574, the format of the index or tabular structure of the information store 554, and other parameters.

In an example, and as illustrated in FIG. 15, each data unit 576 of the data sets 574 is assigned a unit position, or a cell, in the information store 554. In an example, the data units 576 are arranged in rows and columns. In an example, the unit position of each data unit 576 is defined by an intersection of a row of data units and a column of data units. For example, data set 574a is arranged in row one (R1), data set 574b is arranged in row two (R2), and data set 574c is arranged in row three (R3). The rows form column one (C1), column two (C2), column three (C3), column four (C4), column five (C5), column six (C6), column seven (C7), and column eight (C8). In this example, the first data unit 576 of the first data set 574a is located at the (R1, C1) unit position, the second data unit 576 of the first data set 574a is located at the (R1, C2) unit position, the first data unit 576 of the second data set 574b is located at the (R2, C1) unit position, the second data unit 576 of the second data set 574b is located at the (R2, C2) unit position, the first data unit 576 of the third data set 574c is located at the (R3, C1) unit position, and so on.

In an example, the custom key 514 is extracted from the information store 554 by selecting individual data units 576 from the information store 554, which are used as the data units 566 forming the custom key 514. In an example, the data units 576 selected and extracted from the information store 554 are based on instructions, for example, provided to or provided by the selection algorithm 564.

In an example, the selection algorithm 564 uses the binary sequence 556 to select the data units 576 to be extracted from the information store 554 and used as the data units 566 forming the custom key 514. In an example, the binary sequence 556 is expressed in a binary numeral system consisting of ones ("1") and zeros ("0"). Although the example implementation illustrated in FIG. 15 includes the binary sequence 556 consisting of (e.g., having a length of) eight (8) binary numerals, in other examples the binary sequence 556 has any number binary numerals. For example, the binary sequence 556 can be of any length. In an example, the length of the binary sequence 556 depends on the size of the custom key 514 to be generated, the size of the content 506 to be encrypted and/or decrypted, the size of the data 520, and other parameters. In an example, the binary sequence 556 has at least as many binary numerals as the number of data units 566 forming the custom key 514 (e.g., the binary sequence 556 has a length at least as large as the size of the custom key 514).

In an example, each binary number of the binary sequence 556 is assigned a movement direction and a movement value. In some examples, the movement directions and the movement values are relative to the unit positions defined by the rows and the columns of the information store 554. Examples of the movement direction include vertically up, vertically down, horizontally right, horizontally left and any one of four diagonal directions relative to a particular unit position. Examples of the movement value include one unit position, two unit positions, three unit positions, etc. In an example, each of the zeros in the binary sequence 556 is assigned the same movement direction and the same movement value. In an example, each of the ones in the binary sequence 556 is assigned the same movement direction and the same movement value. In an example, one or more of the zeros in the binary sequence 556 is assigned a different movement direction and/or a different movement value. In an example, one or more of the ones in the binary sequence 556 is assigned a different movement direction and/or a different movement value. In an example, the movement direction and movement value of each binary number of the binary sequence 556 is assigned based on instructions, for example, provided to or provided by the selection algorithm 564.

In an example, before selecting and extracting the data units 576 from the information store 554, a start position 580 is assigned. In an example, the start position 580 is assigned based on instructions, for example, provided to or provided by the selection algorithm 564. In the illustrative example, the (R1, C1) unit position in the information store 554 is selected as the start position 580. In other examples, any other unit position in the information store 554 is assigned as the start position 580.

In the example illustrated in FIG. 15, each zero ("0") of the binary sequence 556 is assigned a movement direction of vertically down and a movement value of one unit position and each one ("1") of the binary sequence 556 is assigned a movement direction of horizontally right and a movement value of one unit position. In other examples, each zero ("0") of the binary sequence 556 is assigned one of any other movement direction and one of any other movement value and/or each one ("1") of the binary sequence 556 is assigned one of any other movement direction and one of any other movement value. In an example, all of the zeros ("0") of the binary sequence 556 are assigned the same movement direction and the movement value. In an example, one or more of the zeros ("0") of the binary sequence 556 is assigned a different movement direction and/or movement value than one or more other zeros ("0") of the binary sequence 556. In an example, all of the ones ("1") of the binary sequence 556 are assigned the same movement direction and the movement value. In an example, one or more of the ones ("1") of the binary sequence 556 is assigned a different movement direction and/or movement value than one or more other ones ("1") of the binary sequence 556.

In the example illustrated in FIG. 15, the start position 580 is designated as a first unit retrieval position 584. Therefore, the first unit retrieval position 584 is the (R1, C1) unit position and the data unit "0" located at the (R1, C1) unit position is the data unit 576 selected and extracted from the information store 554 as the first data unit 566 forming the custom key 514. In another example, the unit position following the movement direction and movement value of the first binary number of the binary sequence 556 is designated as the first unit retrieval position 584.

In the example illustrated in FIG. 15, the first binary number of the binary sequence 556 is a one ("1"), which updates, or moves, the unit retrieval position 584 to the right by one unit position. Therefore, the second unit retrieval position 584 is the (R1, C2) unit position and the data unit "1" located at the (R1, C2) unit position is selected and extracted as the second data unit 566 forming the custom key 514. The next (e.g., second) binary number of the binary sequence 556 is a one ("1"), which updates, or moves, the unit retrieval position 584 to the right by one unit position. Therefore, the third unit retrieval position 584 is the (R1, C3) unit position and the data unit "1" located at the (R1, C3) unit position is selected and extracted as the third data unit 566 forming the custom key 514. The next (e.g., third) binary number of the binary sequence 556 is a zero ("0"), which updates, or moves, the unit retrieval position 584 down by one unit position. Therefore, the fourth unit retrieval position 584 is the (R2, C3) unit position and the data unit "1" located at the (R2, C3) unit position is selected and extracted as the fourth data unit 566 forming the custom key 514. This process continues until all of the data units 566 forming the custom key 514 have been selected and extracted from the information store 554 according to the movement and selection criteria based on the binary sequence 556. In the example illustrated in FIG. 15, the underlined data units 576 indicate the data units 576 that are selected and extracted following the updates to the unit retrieval positions 584 according to the illustrative example binary sequence 556.

In some examples, one or more of the unit positions in the information store 554 does not contain an associated data unit 576, also referred to as an empty unit position. In an example, when the updated unit retrieval position 584 moves to an empty unit position, no data unit 576 is selected and the unit retrieval position 584 is again updated. In an example, updating the unit retrieval position 584 includes moving the unit retrieval position 584 to the next unit position according to the movement direction and movement value of the next binary number of the binary sequence 556. In an example, updating the unit retrieval position 584 includes automatically moving the unit retrieval position 584 in a predetermined movement direction by a predetermined movement value. For example, and as illustrated in FIG. 15, instead of moving down one unit position from the fourth unit retrieval position 584 (R2, C3) to the empty unit position (R3, C3) according to the fifth binary number of the binary sequence 556, which is a zero ("0"), the unit retrieval position 584 automatically moves to the right by one unit position to the (R2, C5) unit position. Therefore, the fifth unit retrieval position 584 is the (R2, C5) unit position and the data unit "0" located at the (R2, C5) unit position is selected and extracted as the fifth data unit 566 forming the custom key 514. In other examples, instead of moving into the empty unit position, the unit retrieval position 584 automatically moves in one of any movement direction by one of any movement value. In an example, how the unit retrieval position 584 is updated when instructed to move into an empty unit position is based on instructions, for example, provided to or provided by the selection algorithm 564.

In some examples, the binary sequence 556 moves the unit retrieval position 584 to an end (e.g., the left end or the right end) of a row or an end (e.g., the top or the bottom) of a column. In this instance, the unit retrieval position 584 is again updated. In an example, updating the unit retrieval position 584 includes moving the unit retrieval position 584 to the next unit position according to the movement direction and movement value of the next binary number of the binary sequence 556. In an example, updating the unit retrieval position 584 includes automatically moving the unit retrieval position 584 to an opposing end of an adjacent row or an opposing end of an adjacent column. In an example, how the unit retrieval position 584 is updated when instructed to move beyond an end of a row or a column is based on instructions, for example, provided to or provided by the selection algorithm 564.

In an example, instead of using the generated binary sequence 556, the selection algorithm 564 uses some or all of other data 520, for example, from another key source 508. In this example, the process of selecting and extracting the particular data units 576 from the information store 554 is substantially the same as described with the binary sequence 556.

In an example, the selection algorithm 564 uses the look-up table 582 to select the data units 576 to be extracted from the information store 554 and used as the data units 566 forming the custom key 514. In an example, the look-up table 582 includes the plurality of unit-selection entries 586. In an example, each entry 586 refers to or identifies one or more data units 576 located in the information store 554. In various examples, the entry 586 has any suitable format to identify particular data units 576, such as unit position, ranges of data units 576 and the like. In the example illustrated in FIG. 15, the entry 586 references the particular unit positions indicated by row and column (e.g., (R1, C1)-(R1, C3)) to indicate the data units 576 to be selected and extracted from the information store 554. In other examples, the entry 586 references one or more of a particular key source 508 (e.g., the first key source 508*a*), one or more particular data sets 574 (e.g., the first data set 574*a*), one or more particular data units 576 of a row (e.g., b1-b3 of row R1), one or more particular data units 576 of a particular data set 574 (e.g., b3-b5 of data set 574*a*) or some combination thereof. Although the example implementation illustrated in FIG. 15 includes the look-up table 582 consisting of three (3) entries 586, in other examples, the look-up table 582 has any number of entries 586. In some examples, here is no limit to the number of entries 586 in the look-up table 582. In an example, the number of entries 586 of the look-up table 582 and/or the format of each entry 586 (e.g., the number of data units 576 identified by each entry 586) depend on the size of the custom key 514 to be generated, the size of the content 506 to be encrypted and/or decrypted, the size of the data 520, and other parameters.

In an example, the selection algorithm 564 uses a combination of the binary sequence 556 and the look-up table 582 to select the particular data units 576 to be extracted from the information store 554 and used as the data units 566 forming the custom key 514.

Although the example implementation illustrated in FIG. 15 includes the custom key 514 consisting of (e.g., having a size of) eight (8) data units 566 (e.g., 8 bits), in other examples the custom key 514 has any number of data units 566. For example, the custom key 514 can be of any size. In some examples, there is no limit to the size (e.g., the number of bits) of the custom key 514. In an example, the size of the custom key 514 depends on the size of the content 506 to be encrypted and/or decrypted, the encryption or decryption technique or algorithm used, and other parameters. In an example, the custom key 514 is at least as large as the content 506 to be encrypted or decrypted.

In an example, the custom key 514 includes 128 data units 566 (e.g., bits), for example, for use with AES encryption and decryption. In an example, the custom key 514 includes 192 data units 566 (e.g., bits), for example, for use with AES encryption and decryption. In an example, the custom key 514 includes 256 data units 566 (e.g., bits), for example, for use with AES encryption and decryption.

In an example, the custom key 514 is has at least as many data units 566 (e.g., bits) as the number of bits forming the content 506 to be encrypted and/or decrypted (e.g., the custom key 514 is at least as large as the content 506). In this example, the custom key 514 is a "one-time pad" (OTP). Because of the key generation process described herein, the custom key 514 is truly random. Whereas other random data generators or random key generators are algorithmically based and, as such, are not truly random. Because the key generation process uses key sources 508 based on an almost infinite supply of web content, the process described herein generates a the custom key 514 that is used only once. Therefore, because the custom key 514 generated by the methods, systems and computer program products described herein is completely random and is used only once, content 506 encrypted using the custom key 514 provides encrypted content 542 that is mathematically impossible to decrypt without the custom key 514.

In some examples, the custom key 514 is generated by performing one or more arithmetic operations. In an example, the key generation module 550 derives a first custom key 514 according to any of the methods or processes described herein. The key generation module 550 then derives a second custom key 514 according to any of the methods processes described herein. In some examples, any additional number of custom keys 514 may also be generated. In an example, the data units 566 of the first custom key 514 are added to the data units 566 of the second custom key 514. In an example, the data units 566 of the first custom key 514 and the data units 566 of the second custom key 514 are multiplied together. Additionally, or alternatively, in an example, the data units 566 of the custom key 514 are further complicated and randomized, for example, by at least one of mixing, swapping, transposing, transforming, inverting, flipping, adding, inserting, replacing, hashing, and/or deleting one or more of the data units 566.

Figure 16:
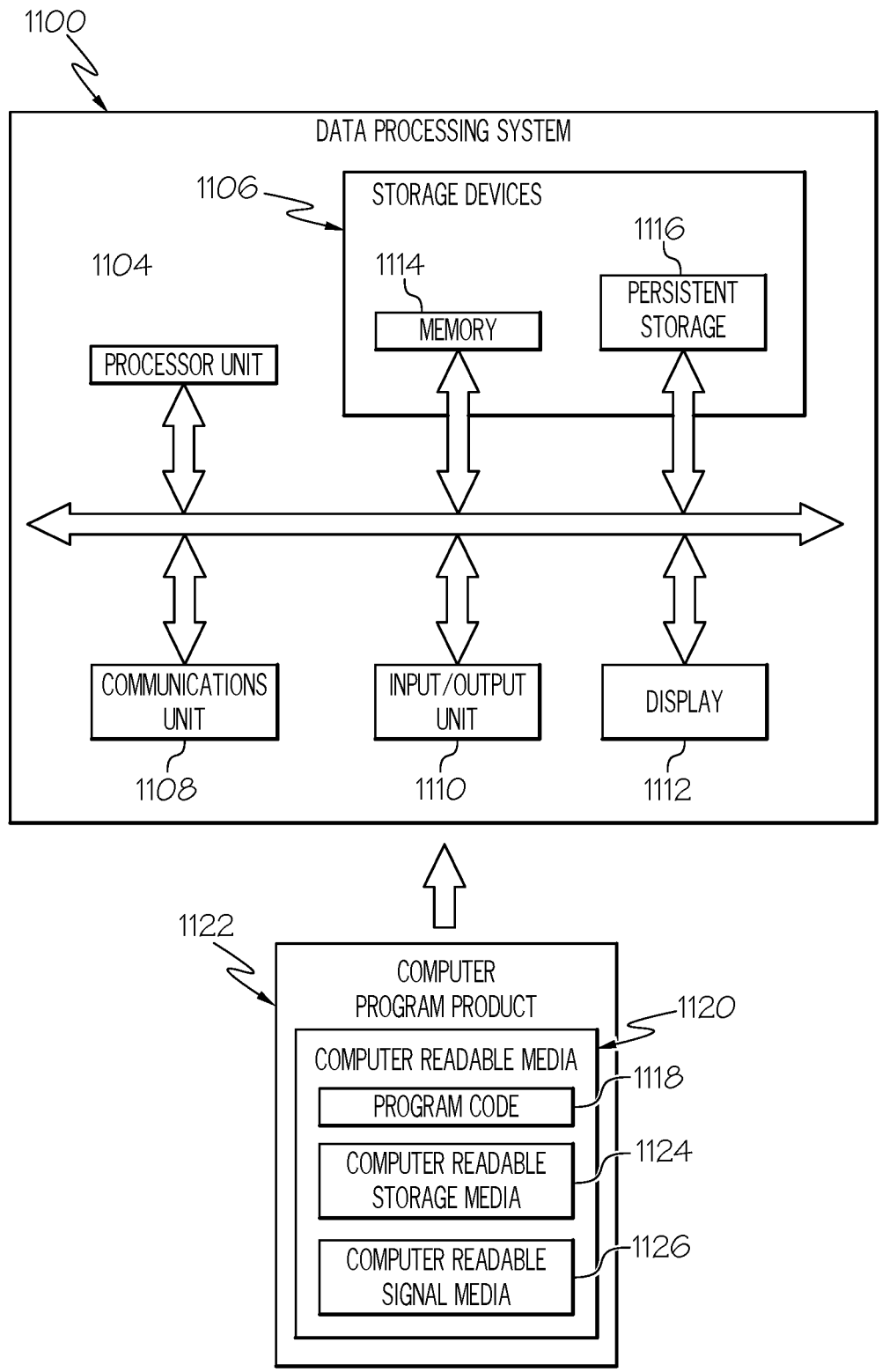
FIG. 16 is a schematic block diagram of an embodiment of a data processing system.

Referring to FIG. 16, in an example, the methods and processes described herein are implemented by a data processing system 1100. In an example, as illustrated, the data processing system 1100 includes a communications framework 1102, which provides communications between a processor unit 1104, a storage devices 1106, a communications unit 1108, an input/output unit 1110, and a display 1112. In some examples, the communications framework 1102 is implemented as a bus system.

In an example, the processor unit 1104 is configured to execute instructions for software to perform a number of operations. In some examples, the processor unit 1104 includes a number of processors, a multi-processor core, and/or some other type of processor, depending on the implementation. In some examples, the processor unit 1104 takes the form of a hardware unit, such as a circuit system, an application specific integrated circuit (ASIC), a programmable logic device, or some other suitable type of hardware unit.

In some examples, instructions for the operating system, applications, and/or programs run by the processor unit 1104 are located in the storage devices 1106. In an example, the storage devices 1106 are in communication with the processor unit 1104 through the communications framework 1102. As used herein, a storage device, also referred to as a computer readable storage device, is any piece of hardware capable of storing information on a temporary and/or permanent basis. This information may include, but is not limited to, data, program code, and/or other information.

In some examples, the memory 1114 and the persistent storage 1116 are examples of the storage devices 1106. In an example, the memory 1114 takes the form of, for example, a random access memory or some type of volatile or non-volatile storage device. In an example, the persistent storage 1116 includes any number of components or devices. For example, the persistent storage 1116 includes a hard drive, a flash memory, a rewritable optical disk, a rewritable magnetic tape, or some combination of the above. The media used by the persistent storage 1116 may or may not be removable.

In some examples, the communications unit 1108 allows the data processing system 1100 to communicate with other data processing systems, devices, or some combination thereof. In an example, the communications unit 1108 provides communications using physical and/or wireless communications links.

In some examples, the input/output unit 1110 allows input to be received from and output to be sent to other devices connected to the data processing system 1100. For example, the input/output unit 1110 allows user input to be received through a keyboard, a mouse, or some other type of input device. As another example, the input/output unit 1110 allows output to be sent to a printer connected to the data processing system 1100.

In some examples, the display 1112 is configured to display information to a user. In an example, the display 1112 includes, for example, without limitation, a monitor, a touch screen, a laser display, a holographic display, a virtual display device, and/or some other type of display device.

In the example illustrated in FIG. 16, the processes and/or operations of the different illustrative embodiments are performed by the processor unit 1104 using computer-implemented instructions. These instructions may be referred to as program code, computer usable program code, or computer readable program code and may be read and executed by one or more processors in the processor unit 1104.

In these examples, the program code 1118 is located in a functional form on computer readable media 1120, which is selectively removable, and may be loaded onto or transferred to the data processing system 1100 for execution by the processor unit 1104. The program code 1118 and the computer readable media 1120 together form the computer program product 1122. In the illustrative example, the computer readable media 1120 may be computer readable storage media 1124 or computer readable signal media 1126.

In an example, the computer readable storage media 1124 is a physical or tangible storage device used to store program code 1118 rather than a medium that propagates or transmits program code 1118. The computer readable storage media 1124 is, for example, without limitation, an optical or magnetic disk or a persistent storage device that is connected to the data processing system 1100.

Alternatively, in an example, the program code 1118 is transferred to the data processing system 1100 using computer readable signal media 1126. The computer readable signal media 1126 is, for example, a propagated data signal containing program code 1118. This data signal may be an electromagnetic signal, an optical signal, or some other type of signal that can be transmitted over physical communications links, wireless communications links, or some combination thereof.

Accordingly, the examples disclosed herein enable more secure communication of information to occur and protects the transmission of content from interception or modification. Further, the complexity of encryption may be reduced using the methods and processes described herein. As a result, the processing resources needed for secure communication of content between networked computing devices may be reduced through the less intensive processing that occurs. Additionally, the multiple layers of randomization described herein maintain the secrecy and effectiveness of the encryption process by requiring every component of the key generation process (e.g., the particular key sources, the data sets identified by the key source directory, the binary sequence 556, the look-up table 582, the instructions, etc.). For example, if an unauthorized party (e.g., a hacker) were to intercept or otherwise obtain an incomplete set of components of the key generation process, the unauthorized party is still unable to decrypt the encrypted content.

In FIGS. 1, 2, 5, 8-10, 15 and 16, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. One or more elements shown in solid lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1, 2, 5, 8-10, 15 and 16 may be combined in various ways without the need to include other features described in FIGS. 1, 2, 5, 8-10, 15 and 16, other drawing figures, and/or the accompanying disclosure, even though such combination or combinations are not explicitly illustrated herein. Similarly, additional features not limited to the examples presented, may be combined with some or all of the features shown and described herein.

In FIGS. 3, 4, 13 and 14, referred to above, the blocks may represent operations and/or portions thereof and lines connecting the various blocks do not imply any particular order or dependency of the operations or portions thereof. It will be understood that not all dependencies among the various disclosed operations are necessarily represented. FIGS. 3, 4, 13 and 14 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the present description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or e.g., a "third" or higher-numbered item.

Reference herein to "one example," "an example," "one embodiment," or "an embodiment" means that one or more feature, structure, or characteristic described in connection with the example or embodiment is included in at least one implementation. The phrase "one example" in various places in the specification may or may not be referring to the same example. The phrase "one embodiment" in various places in the specification may or may not be referring to the same embodiment.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, the phrase "at least one of," when used with a list of items, means different combinations of one or more of the listed items may be used and only one of the items in the list may be needed. For example, "at least one of item A, item B, and item C" may include, without limitation, item A; both item A and item B; item A, item B, and item C; or item B and item C. In other examples, "at least one of" may be, for example, without limitation, two of item A, one of item B, and ten of item C; four of item B and seven of item C; or some other type of combination. The item may be a particular object, thing, or a category. In other words, "at least one of" means any number of and any combination of items may be used from the list, but not all of the items in the list may be required.

Although various embodiments and examples of the disclosed methods, systems and computer program products have been shown and described, modifications may occur to those skilled in the art upon reading the specification. The present application includes such modifications and is limited only by the scope of the claims.

What is claimed is:

1. A method comprising:
generating a key source directory, comprising a plurality of pointers that specify a plurality of key sources;
accessing the plurality of key sources according to the plurality of pointers of the key source directory;
receiving data from the plurality of key sources;
retrieving a plurality of data sets from the data, each one of the plurality of data sets comprising a plurality of data units;
extracting a plurality of selected data units from the plurality of data units; and
generating a custom key for encrypting and decrypting content using the plurality of selected data units,
wherein the plurality of pointers of the key source directory specifies a location of each one of the plurality of key sources on a computer network and at least one of a time standard for accessing each one of the plurality of key sources and a portion of the data to be retrieved as each one of the plurality of data sets.

2. The method of claim 1, wherein at least a portion of the data received from the plurality of key sources is a data stream.

3. The method of claim 1, further comprising:
generating an information store, comprising a plurality of unit positions;
assigning each one of the plurality of data units to one of the plurality of unit positions; and
selecting individual data units of the plurality of data units from the plurality of unit positions as the plurality of selected data units.

4. The method of claim 3, further comprising:
designating an individual unit position of the plurality of unit positions as a unit retrieval position; and
selecting an individual data unit of the plurality of data units located at the unit retrieval position as one of the plurality of selected data units.

5. The method of claim 4, further comprising:
using a binary sequence, wherein each numeral of the binary sequence is assigned a movement direction and a movement value;
designating a subsequent unit position of the plurality of unit positions as a subsequent unit retrieval position according to the movement direction and the movement value of a subsequent numeral of the binary sequence; and
selecting a subsequent individual data unit of the plurality of data units located at the subsequent unit retrieval position as another one of the plurality of selected data units.

6. The method of claim 3, further comprising:
using a look-up table comprising a plurality of entries, wherein each one of the entries specifies at least one of the plurality of unit positions;
designating individual unit positions of the plurality of unit positions as a plurality of unit retrieval positions according to the plurality of entries; and
selecting the individual data units of the plurality of data units located at the plurality of unit retrieval positions as the selected data units.

7. The method of claim 1, further comprising encrypting content using the custom key.

8. A method comprising:
receiving data from a plurality of key sources;
retrieving a plurality of data sets from the data, each one of the plurality of data sets comprising a plurality of data units;
assigning each one of the plurality of data units to one of a plurality of unit positions;
designating unit retrieval positions from the plurality of unit positions according to a movement direction and a movement value assigned to each numeral of a binary sequence;

extracting individual data units, located at the unit retrieval positions, as a plurality of selected data units; and generating a custom key using the plurality of selected data units.

9. The method of claim 8, further comprising:
generating a key source directory, comprising a plurality of pointers that specify the plurality of key sources; and
accessing the plurality of key sources according to the plurality of pointers of the key source directory.

10. The method of claim 9, wherein the plurality of pointers of the key source directory specifies a location of each one of the plurality of key sources on a computer network and at least one of a time standard for accessing each one of the plurality of key sources and a portion of the data to be retrieved as each one of the plurality of data sets.

11. The method of claim 8, further comprising:
generating an information store, comprising the plurality of unit positions, wherein the plurality of unit positions is arranged in rows and columns.

12. The method of claim 11, further comprising:
selecting a first data unit of the plurality of data units, located at a first unit retrieval position, as a first one of the plurality of selected data units;
moving along the rows and columns to a second unit retrieval position according to the movement direction and the movement value assigned to a first numeral of the binary sequence; and
selecting a second data unit of the plurality of data units, located at the second unit retrieval position, as a second one of the plurality of selected data units.

13. The method of claim 12, further comprising:
moving along the rows and columns to a third unit retrieval position according to the movement direction and the movement value assigned to a second numeral of the binary sequence; and
selecting a third data unit of the plurality of data units, located at the third unit retrieval position, as a third one of the plurality of selected data units.

14. The method of claim 8, further comprising encrypting content using the custom key.

15. The method of claim 14, further comprising:
receiving encrypted content;
generating a second custom key using the plurality of selected data units, wherein the second custom key is the same as the custom key; and
decrypting the encrypted content using the second custom key.

16. A computer program product comprising a non-transitory computer-readable medium comprising computer-readable instructions stored thereon, wherein execution of the computer-readable instructions by a processor unit causes the processor unit to:
generate a key source directory, comprising a plurality of pointers that specify the plurality of key sources;
access the plurality of key sources according to the plurality of pointers of the key source directory
receive data from the plurality of key sources;
retrieve a plurality of data sets from the data, each one of the plurality of data sets comprising a plurality of data units;
extract a plurality of selected data units from the plurality of data units; and
generate a custom key for encrypting and decrypting content using the plurality of selected data units,
wherein the plurality of pointers of the key source directory specifies a location of each one of the plurality of key sources on a computer network and at least one of a time standard for accessing each one of the plurality of key sources and a portion of the data to be retrieved as each one of the plurality of data sets.

17. The computer program product of claim 16, wherein execution of the computer-readable instructions further causes the processor unit to:
generate an information store, comprising a plurality of unit positions;
assign each one of the plurality of data units to one of the plurality of unit positions; and
select individual data units of the plurality of data units from the plurality of unit positions as the plurality of selected data unit.

18. The computer program product of claim 17, wherein execution of the computer-readable instructions further causes the processor unit to:
designate an individual unit position of the plurality of unit positions as a unit retrieval position; and
select an individual data unit of the plurality of data units located at the unit retrieval position as one of the plurality of selected data units.

19. The computer program product of claim 18, wherein execution of the computer-readable instructions further causes the processor unit to:
use a binary sequence, wherein each numeral of the binary sequence is assigned a movement direction and a movement value;
designate a subsequent unit position of the plurality of unit positions as a subsequent unit retrieval position according to the movement direction and the movement value of a subsequent numeral of the binary sequence; and
select a subsequent individual data unit of the plurality of data units located at the subsequent unit retrieval position as another one of the plurality of selected data units.

20. The computer program product of claim 16, wherein execution of the computer readable instruction further causes the processor unit to encrypt content using the custom key.

* * * * *